US012303787B2

(12) United States Patent
Ge

(10) Patent No.: US 12,303,787 B2
(45) Date of Patent: May 20, 2025

(54) CONTROLLING A VIRTUAL OBJECT BASED ON STRENGTH VALUES

(71) Applicant: Tencent Technology (Shenzhen) Company Limited, Guangdong (CN)

(72) Inventor: Yichen Ge, Shenzhen (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 288 days.

(21) Appl. No.: 17/948,470

(22) Filed: Sep. 20, 2022

(65) Prior Publication Data

US 2023/0016383 A1    Jan. 19, 2023

Related U.S. Application Data

(63) Continuation of application No. PCT/CN2021/122689, filed on Oct. 8, 2021.

(30) Foreign Application Priority Data

Oct. 15, 2020    (CN) .......................... 202011104397.0

(51) Int. Cl.
    *A63F 13/58*    (2014.01)
    *A63F 13/52*    (2014.01)
    *A63F 13/53*    (2014.01)

(52) U.S. Cl.
    CPC .............. *A63F 13/58* (2014.09); *A63F 13/52* (2014.09); *A63F 13/53* (2014.09); *A63F 2300/65* (2013.01)

(58) Field of Classification Search
    None
    See application file for complete search history.

(56) References Cited

U.S. PATENT DOCUMENTS

| 6,203,426 B1 * | 3/2001 | Matsui ..................... A63F 13/55 |
| | | 463/6 |
| 2009/0029769 A1 * | 1/2009 | Muller ..................... A63F 13/58 |
| | | 463/31 |

(Continued)

FOREIGN PATENT DOCUMENTS

| CN | 201832408 U | 5/2011 |
| CN | 109784299 A | 5/2019 |

(Continued)

OTHER PUBLICATIONS

Japanese Office Action issued Nov. 14, 2023 in Application No. 2022-572529 with English Translation (11 pages).

(Continued)

*Primary Examiner* — Jason T Yen
(74) *Attorney, Agent, or Firm* — ARENTFOX SCHIFF LLP

(57) ABSTRACT

A method for controlling a virtual object includes displaying physical strength display components corresponding to a virtual object, each of the physical strength display components being configured to display a physical strength consumption status of a corresponding body part of the virtual object. Different physical strength display components correspond to different body parts of the virtual object. The method further includes determining, in response to a control operation instructing the virtual object to perform an action, a physical strength display component corresponding to the control operation. A body part of the virtual object used to perform the action corresponds to the determined physical strength display component. The method also includes controlling the virtual object to perform the action, and updating a first remaining physical strength value displayed by the determined physical strength display component to a second remaining physical strength value.

20 Claims, 10 Drawing Sheets

(56) References Cited

U.S. PATENT DOCUMENTS

| | | | | |
|---|---|---|---|---|
| 2014/0357360 A1* | 12/2014 | Shono | ............... | A63F 13/46 463/31 |
| 2015/0050997 A1* | 2/2015 | Suzman | ............... | A63F 13/55 463/31 |
| 2017/0326452 A1* | 11/2017 | Kikuchi | ............... | G07F 17/3251 |
| 2018/0221770 A1* | 8/2018 | Morishita | ............... | A63F 13/58 |
| 2020/0215434 A1* | 7/2020 | Goldman | ............... | A63F 13/213 |

FOREIGN PATENT DOCUMENTS

| | | | |
|---|---|---|---|
| CN | 112138392 A | 12/2020 | |
| JP | 2001009164 A | 1/2001 | |
| JP | 2010082054 A | 4/2010 | |
| JP | 2011104391 A | 6/2011 | |

OTHER PUBLICATIONS

Stamina—Genshin Strategy Summary Wiki, [online], Oct. 5, 2020, <URL:https://wiki.dengekionline.com/genshin/Stamina>, Retrieved Oct. 20, 2023.

PC game review "Silent Storm Japanese version", [online], Apr. 9, 2007, <URL:https://game.watch.impress.co.jp/docs/20040709/silents.htm>, Searched on Nov. 6, 2023.

[Death Stranding] Various gauges such as blood, stamina, patience, and fainting [online], Nov. 7, 2019, <URL: https://gamerch.com/death-stranding/entry/108800>, searched on Nov. 6, 2023.

Stamina | Genshin Impact Wiki | Fandom, [online], Oct. 7, 2020, <URL:https://genshin-impact.fandom.com/wiki/Stamina>, Retrieved Nov. 6, 2023.

Food | Genshin Impact Wiki | Fandom, [online], Jul. 17, 2020, <URL:https://genshin-impact.fandom.com/wiki/Food>, Retrieved Nov. 7, 2023.

International Search Report and Written Opinion issued Jan. 6, 2022 in International Application No. PCT/CN2021/122689 with English Translation (10 pages).

Detailed Explanation of the Stamina Setting in Genshin Impact, Mop.com, https://www.mop.com/news/21377.html, Mar. 17, 2020, Full text, "I Stamina Setting". "II Recovery Method".

Dark Souls Scientist] Explaining the Basic Systems in the Souls Series: Body Parts Destruction Mechanics, Zhihu, https://zhuanlan.zhihu.com/p/86347288, Oct. 26, 2019, section 2.

* cited by examiner

CONTROLLING A VIRTUAL OBJECT BASED ON STRENGTH VALUES

RELATED APPLICATIONS

This application is a continuation of International Application No. PCT/CN2021/122689, entitled "VIRTUAL OBJECT CONTROL METHOD AND APPARATUS, TERMINAL AND STORAGE MEDIUM," and filed Oct. 8, 2021, which claims priority to Chinese Patent Application No. 202011104397.0, filed on Oct. 15, 2020, and entitled "METHOD AND APPARATUS FOR CONTROLLING VIRTUAL OBJECT, TERMINAL, AND STORAGE MEDIUM." The entire disclosures of the prior applications are hereby incorporated by reference in their entirety.

FIELD OF THE TECHNOLOGY

Embodiments of this application relate to the field of virtual scene technologies, including a method and an apparatus for controlling a virtual object.

BACKGROUND OF THE DISCLOSURE

A battle game is a game in which a plurality of user accounts compete in the same scene. A player may control a virtual object in a virtual environment to perform actions such as walking, running, climbing, and shooting, and a plurality of players may form a team online to collaboratively complete a task in the same virtual environment.

In the related art, when a virtual object runs in a virtual environment, physical strength value consumption is triggered. When physical strength is exhausted, the virtual object cannot continue to run, and needs to wait for the physical strength value to recover before continuing to run. In addition, to facilitate a player to properly control physical strength of a virtual object, a remaining physical strength value of the virtual object is displayed in the form of a physical strength bar.

However, in the related art, the realism of using a single physical strength value to simulate a physical strength consumption status of an object and controlling a virtual object to perform a corresponding action is poor, which affects the authenticity of the battle game.

SUMMARY

Embodiments of this disclosure provide a method and apparatus for controlling a virtual object, which can improve the realism of physical strength consumption of virtual objects and improve the authenticity of battle games. The technical solutions are as follows.

In an embodiment, a method for controlling a virtual object includes displaying, by processing circuitry of a terminal, at least two physical strength display components corresponding to a virtual object. Each of the physical strength display components is configured to display a physical strength consumption status of a corresponding body part of the virtual object. Different physical strength display components correspond to different body parts of the virtual object. The method In an embodiment, an apparatus for controlling a virtual object includes processing circuitry configured to display at least two physical strength display components corresponding to a virtual object, each of the physical strength display components being configured to display a physical strength consumption status of a corresponding body part of the virtual object. Different physical strength display components correspond to different body parts. The processing circuitry is further configured to determine, in response to a control operation instructing the virtual object to perform an action, a physical strength display component corresponding to the control operation. A body part of the virtual object used to perform the action corresponds to the determined physical strength display component. The processing circuitry is also configured to control the virtual object to perform the action, and update a first remaining physical strength value displayed by the determined physical strength display component to a second remaining physical strength value. The second remaining physical strength value is less than the first remaining physical strength value.

In an embodiment, a non-transitory computer-readable storage medium stores computer-readable instruction thereon, which, when executed by processing circuitry, cause the processing circuitry to perform a method for controlling a virtual object. The method includes displaying at least two physical strength display components corresponding to a virtual object, each of the physical strength display components being configured to display a physical strength consumption status of a corresponding body part of the virtual object. Different physical strength display components correspond to different body parts of the virtual object. The method further includes determining, in response to a control operation instructing the virtual object to perform an action, a physical strength display component corresponding to the control operation. A body part of the virtual object used to perform the action corresponds to the determined physical strength display component. The method also includes controlling the virtual object to perform the action, and updating a first remaining physical strength value displayed by the determined physical strength display component to a second remaining physical strength value. The second remaining physical strength value is less than the first remaining physical strength value.

In the embodiments of this disclosure, the physical strength consumption status of different body parts of the virtual object when performing actions is displayed through the plurality of physical strength display components. Compared with a single display form of physical strength values and physical strength consumption in the related art, the realism of physical strength consumption of the virtual object when performing actions is improved. In addition, the virtual object is controlled to perform actions according to remaining physical strength values of different body parts, which simulates the impact of physical strength consumption on the execution of various actions, thereby improving the authenticity of performing actions by the virtual object, and further improving the authenticity of the battle game.

DESCRIPTION OF EMBODIMENTS

Figure 1:
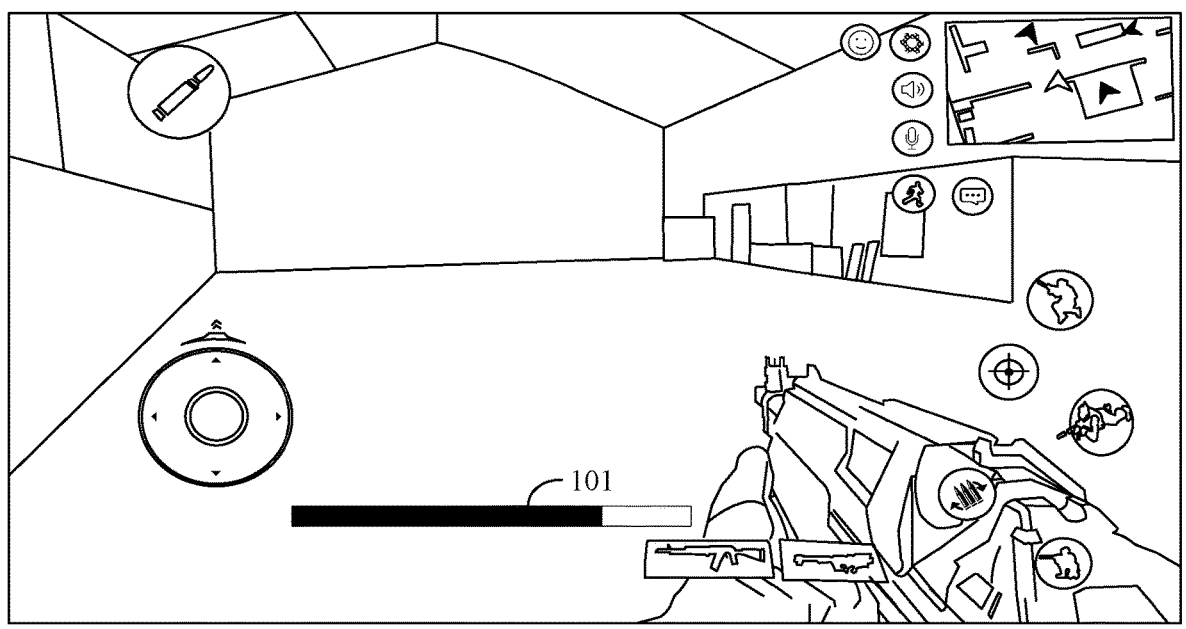
FIG. 1 is a schematic diagram of a physical strength display component in a virtual environment interface in the related art.

First, terms involved in the embodiments of this disclosure are introduced.

A virtual environment includes a virtual environment displayed (or provided) by an application when run on a terminal. The virtual environment may be a simulated environment of a real world, or may be a semi-simulated semi-fictional environment, or may be an entirely fictional environment. The virtual environment may be any one of a two-dimensional virtual environment, a 2.5-dimensional virtual environment, and a three-dimensional virtual environment. This is not limited in this disclosure. A description is made in the following embodiments by taking an example where the virtual environment is a three-dimensional virtual environment.

A virtual object includes a movable object in a virtual environment. The movable object may be a virtual person, a virtual animal, a cartoon character, or the like, such as a character or an animal displayed in a three-dimensional virtual environment. In an embodiment, the virtual object is a three-dimensional model created based on a skeletal animation technology. Each virtual object has a respective shape and size in the three-dimensional virtual environment, and occupies some space in the three-dimensional virtual environment.

A shooting game includes first-person shooting game and third-person shooting game. The first-person shooting game is a shooting game in which a user can play from a first-person perspective. A virtual environment picture in the game is a picture of a virtual environment observed from a perspective of a first virtual object. The third-person shooting game is a shooting game played from a third-person perspective. A virtual environment picture in the game is a picture of a virtual environment observed from a third-person perspective (for example, behind a head of a first virtual object).

In the game, at least two virtual objects play in a single-round battle mode in the virtual environment. The virtual object escapes attacks by other virtual objects and dangers (such as a poison gas area and a swamp) in the virtual environment to survive in the virtual environment. When the hit point of the virtual object in the virtual environment is zero, the life of the virtual object in the virtual environment ends, and the final virtual object surviving in the virtual environment wins. In an embodiment, a battle starts with a moment when a first client joins the battle, and ends with a moment when the last client exits the battle. Each client may control one or more virtual objects in the virtual environment. In an embodiment, arena modes of the battle may include a single-player battle mode, a two-player team battle mode, or a multi-player team battle mode. The battle mode is not limited in the embodiments of this disclosure.

Virtual item are items that a virtual object can use in a virtual environment, including virtual weapons that can change attribute values of other virtual objects, supply items such as bullets, defense items such as shields, armor, and armored vehicles, virtual items displayed by hands when the virtual object releases skills such as virtual beams and virtual shock waves, and part of the body of the virtual object such as hands and legs. Virtual items that can change attribute values of other virtual objects include long-range virtual items such as pistols, rifles, and sniper rifles, short-range virtual items such as daggers, knives, swords, and ropes, and throwing virtual items such as flying axes, flying knives, grenades, flash grenades, and smoke grenades.

The method provided in this disclosure may be applied to a virtual reality application, a three-dimensional map program, a first/third-person shooting game, a multiplayer online battle arena (MOBA) game, and the like. An application in a game is used as an example for description in the following embodiments.

A game based on a virtual environment usually includes maps of one or more game worlds. The virtual environment in the game simulates scenes in the real world. A user may control a virtual object in the game to perform actions in the virtual environment such as walking, running, jumping, shooting, combatting, driving, switching to virtual items, and using a virtual item to attack another virtual object, which has relatively high interactivity. In addition, a plurality of users may form a team online to perform an arena game.

In the related art, only a single physical strength bar is used in the virtual environment to display a physical strength consumption status of a virtual object, and the virtual object is controlled to perform corresponding actions based on a single physical strength value. As shown in FIG. 1, only a physical strength display component 101 is displayed in a virtual environment. When a player controls a virtual object in the virtual environment to run, a physical strength value in the corresponding physical strength display component 101 decreases. When the physical strength value in the physical strength display component 101 is 0, the virtual object cannot continue to run (only can walk), and needs to wait for the physical strength value to recover. In the related art, the physical strength value of the virtual object is displayed in a single form, and only the physical strength consumption of the virtual object as a whole is simulated. The physical strength consumption is expressed in a single form, and the realism of the physical strength consumption of virtual objects is low, which affects the authenticity of the battle game.

To resolve the problem of the single display form of physical strength consumption in the related art, a plurality of physical strength display components are introduced in this embodiment of this disclosure. The physical strength consumption statuses of different body parts of the virtual object are indicated through the plurality of physical strength display components. For example, when the virtual object performs shooting, physical strength of a relevant body part performing the shooting action changes, which enriches the physical strength cost of the virtual object when performing the action. In addition, the virtual object is controlled to perform the action according to remaining physical strength values of different body parts, which increases the limitation of physical strength consumption on player operations and enhances the realism of the game.

Figure 2:
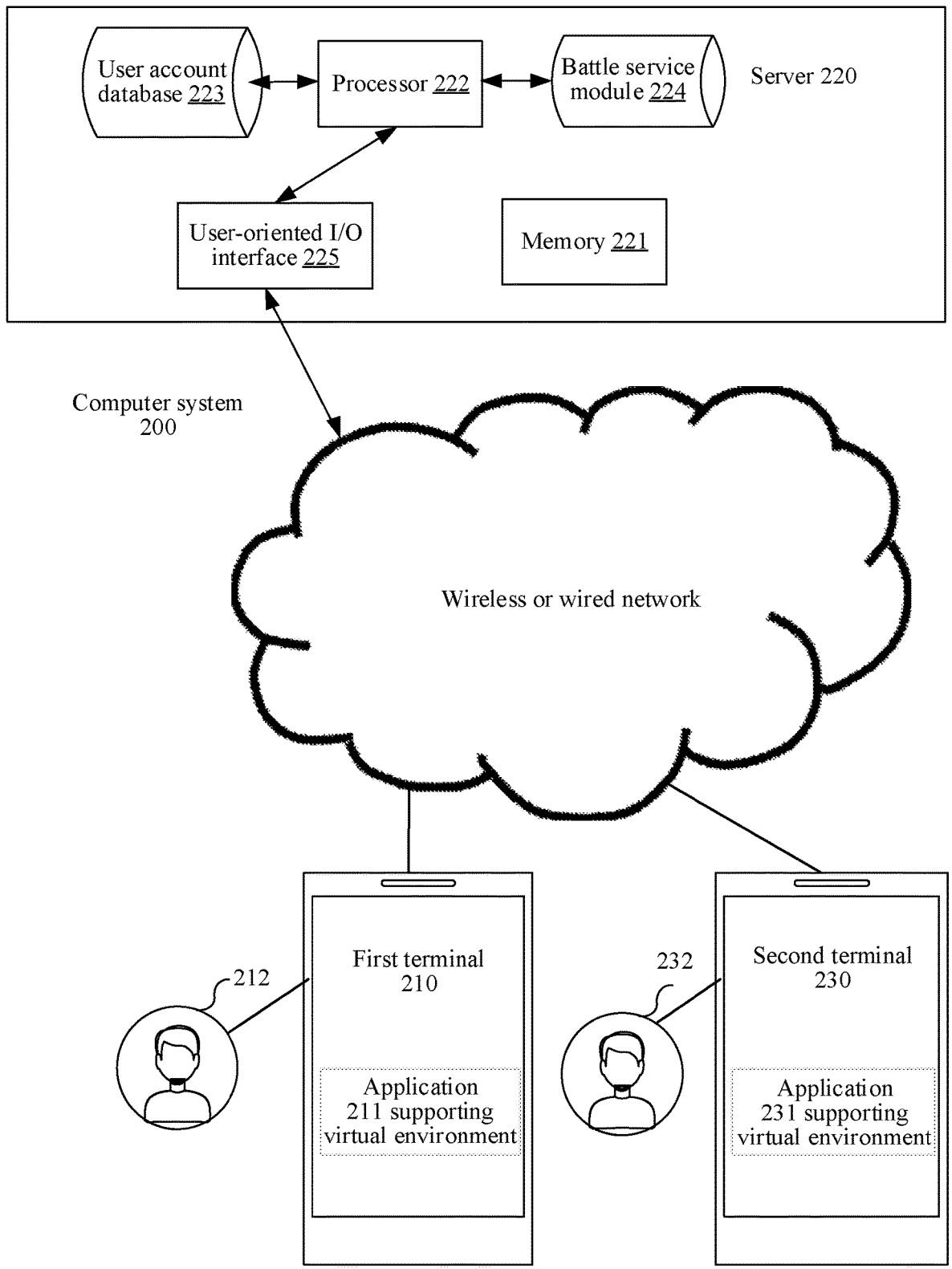
FIG. 2 is a schematic diagram of an implementation environment according to an exemplary embodiment of this disclosure.

FIG. 2 is a schematic diagram of an implementation environment according to an embodiment of this disclosure. The implementation environment may include: a first terminal 210, a server 220, and a second terminal 230.

An application 211 supporting a virtual environment is run on the first terminal 210, and the application 211 may be a multiplayer online battle program. When the first terminal runs the application 211, a user interface of the application 211 is displayed on a screen of the first terminal 110. The application 211 may be any one of a MOBA game, an escape shooting game, or a simulation game (SLG). In this embodiment, an example in which the application 211 is an FPS game is used for description. The first terminal 210 is a terminal used by a first user 212. The first user 212 uses the first terminal 210 to control a first virtual object located in the virtual environment to perform activities, and the first virtual object may be referred to as a master virtual object of the first user 212. The activities of the first virtual object include, but are not limited to: at least one of adjusting body postures, crawling, walking, running, riding, jumping, driving, picking, shooting, attacking, throwing, or releasing skills. For example, the first virtual object is a first virtual character such as a simulated character or a cartoon character.

An application 231 supporting a virtual environment is run on the second terminal 230, and the application 231 may be a multiplayer online battle program. When the second terminal 230 runs the application 231, a user interface of the application 231 is displayed on a screen of the second terminal 230. The client may be any one of a MOBA game, an escape shooting game, and a simulation game (SLG). In this embodiment, an example in which the application 231 is an FPS game is used for description. The second terminal 230 is a terminal used by a second user 232. The second user 232 uses the second terminal 230 to control a second virtual object located in the virtual environment to perform activities, and the second virtual object may be referred to as a master virtual character of the second user 232. For example, the second virtual object is a second virtual character, such as a simulated character or a cartoon character.

In an embodiment, the first virtual object and the second virtual object are located in the same virtual world. The first virtual object and the second virtual object may belong to the same camp, the same team, or the same organization, have a friend relationship with each other, or have a temporary communication permission. The first virtual object and the second virtual object may belong to different camps, different teams, or different organizations, or have a hostile relationship with each other.

In an embodiment, the applications run on the first terminal 210 and the second terminal 230 are the same, or the applications run on the two terminals are the same type of applications on different operating system platforms (Android or IOS). The first terminal 210 may generally refer to one of a plurality of terminals, and the second terminal 230 may generally refer to another one of a plurality of terminals. In this embodiment, the first terminal 210 and the second terminal 230 are used as an example for description. The first terminal 210 and the second terminal 230 are of the same or different device types, the device type including at least one of a smartphone, a tablet computer, an e-book reader, an MP3 player, an MP4 player, a laptop, and a desktop computer.

FIG. 2 shows two terminals. However, a plurality of other terminals may access the server 220 in different embodiments. In an embodiment, there are one or more terminals that are terminals corresponding to the developer. A developing and editing platform for the application supporting the virtual environment is installed on the terminal. The developer can edit and update the application on the terminal and transmit an updated application installation package to the server 220 through a wired or wireless network. The first terminal 210 and the second terminal 230 can download the application installation package corresponding to the application from the server 220 to update the application.

The first terminal 210, the second terminal 230, and the another terminal are connected to the server 220 through a wireless network or a wired network.

The server 220 includes at least one of one server, a server cluster formed by a plurality of servers, a cloud computing platform, or a virtualization center. The server 220 is configured to provide a backend service for an application supporting a three-dimensional virtual environment. In an embodiment, the server 220 is responsible for primary computing work, and the terminal is responsible for secondary computing work; or the server 220 is responsible for secondary computing work, and the terminal is responsible for primary computing work; or the server 220 and the terminal perform collaborative computing by using a distributed computing architecture between each other.

In a schematic example, the server 220 includes a memory 221, a processor 222, a user account database 223, a battle service module 224, and a user-oriented input/output (I/O) interface 225. The processor 222 is configured to load instructions stored in the server 220, and process data in the user account database 223 and the battle service module 224. The user account database 223 is configured to store data of user accounts used by the first terminal 210, the second terminal 230, and the another terminal, for example, avatars of the user accounts, nicknames of the user accounts, battle effectiveness indexes of the user accounts, and service zones of the user accounts. The battle service module 224 is configured to provide a plurality of battle rooms for the users to battle, for example, a 1V1 battle room, a 3V3 battle room, a 5V5 battle room, and the like. The user-oriented I/O interface 225 is configured to establish communication between the first terminal 210 and/or the second terminal 230 by using a wireless network or a wired network for data exchange.

Figure 3:
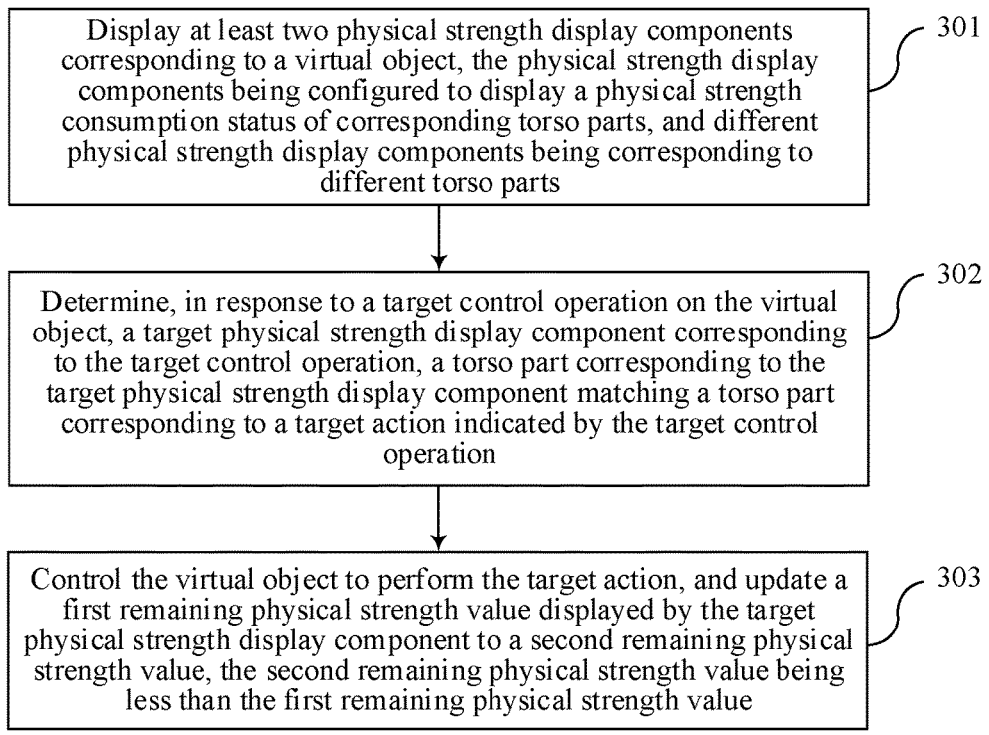
FIG. 3 is a flowchart of a method for controlling a virtual object according to an exemplary embodiment of this disclosure.

FIG. 3 is a flowchart of a method for controlling a virtual object according to an exemplary embodiment of this disclosure. This embodiment is described by using an example in which the method is applied to the first terminal 210 or the second terminal 230 in the implementation environment shown in FIG. 2 or another terminal in the implementation environment. The method includes the following steps.

In Step 301, at least two physical strength display components corresponding to a virtual object are displayed, the physical strength display components being configured to display a physical strength consumption status of corresponding body parts, and different physical strength display components being corresponding to different body parts.

The method of this embodiment of this disclosure is applied to a virtual environment, where the virtual environment includes a first virtual object and a second virtual object, and the first virtual object and the second virtual object belong to different camps. In a possible implementation, the terminal displays the virtual environment through a virtual environment picture. In an embodiment, the virtual environment picture is a picture of the virtual environment observed from the perspective of the virtual object. Perspective is an observation angle for observation from a first-person perspective or a third-person perspective of a virtual object in a virtual environment. In the embodiments of this disclosure, the perspective is an angle for observing the virtual object by using a camera model in the virtual environment.

In an embodiment, the camera model automatically follows the virtual object in the virtual environment. That is, when a position of the virtual object in the virtual environment changes, a position of the camera model following the virtual object in the virtual environment changes simultaneously, and the camera model is within a preset distance range from the virtual object in the virtual environment. In an embodiment, in the automatic following process, relative positions of the camera model and the virtual object remain unchanged.

The camera model is a three-dimensional model located around the virtual object in the three-dimensional virtual environment. When a first-person perspective is used, the camera model is located around the head of the virtual object or located at the head of the virtual object. When a third-person perspective is used, the camera model may be located behind the virtual object and bound to the virtual object, or may be located at any position away from the virtual object by a preset distance. The virtual object located in the virtual environment may be observed from different angles through the camera model. In an embodiment, when the third-person perspective is a first-person over-shoulder perspective, the camera model is located behind the virtual object (for example, the head and the shoulders of the virtual object). In an embodiment, the camera model is not actually displayed in the virtual environment. In other words, the camera model is not displayed in the virtual environment displayed in the user interface.

A description is made by using an example in which the camera model is located at any position at a preset distance from the virtual object. In an embodiment, one virtual object corresponds to one camera model, and the camera model may rotate with the virtual object as a rotation center. For example, the camera model is rotated with any point of the virtual object as the rotation center. During rotation, the camera model is not only rotated, but also displaced. During rotation, a distance between the camera model and the rotation center remains unchanged, that is, the camera model is rotated on a surface of a sphere with the rotation center as a sphere center. Any point of the virtual object may be the head or the body of the virtual object, or any point around the virtual object. This is not limited in the embodiments of this disclosure. In an embodiment, when the camera model observes the virtual object, a center of the perspective of the camera model points to a direction from a point on the spherical surface at which the camera model is located to the sphere center. The camera model may alternatively observe the virtual object at a preset angle in different directions of the virtual object.

In a possible implementation, a virtual environment interface displayed by the terminal includes at least two physical strength display components, where the physical strength display components are configured to display physical strength values of a virtual object, and different physical strength display components are configured to display physical strength values of different body parts of the virtual object. When the virtual object is controlled to perform a corresponding action, the physical strength display components can display physical strength consumption statuses and remaining physical strength statuses of different body parts of the virtual object when performing the action. The virtual environment interface further includes a picture (a first-perspective picture or a third-perspective picture) of the virtual environment observed through a camera model.

In this embodiment of this disclosure, the at least two physical strength display components are configured to display the physical strength consumption statuses of different body parts, and the body parts of the virtual object may be divided according to different division rules. For example, the body parts of the virtual object may be divided into upper limb parts and lower limb parts. In this case, the physical strength display components include upper limb strength display components and lower limb strength display components. Alternatively, the upper limb parts and the lower limb parts may be further subdivided. The upper limb parts may be further divided into a left upper limb part and a right upper limb part, and the lower limb parts may be further divided into a left lower limb part and a right lower limb part. In this case, the physical strength display components include a left upper limb strength display component, a right upper limb strength display component, a left lower limb strength display component, and a right lower limb strength display component.

The body parts of the virtual object may also be divided according to other division rules, and the division manner of the body parts and the quantity of physical strength display components are not limited in the embodiments of this disclosure.

In this embodiment of this disclosure, a physical strength display component is displayed in the virtual environment interface in the form of a rectangle, an arc, a circular ring, a human body model, or the like, or may be displayed in a digital form in the virtual environment interface.

A physical strength display component may be displayed at a bottom middle position, a bottom left position or a top middle position in the virtual environment interface. The display form and the display position of the physical strength display component is not limited in this embodiment of this disclosure.

Figure 4:
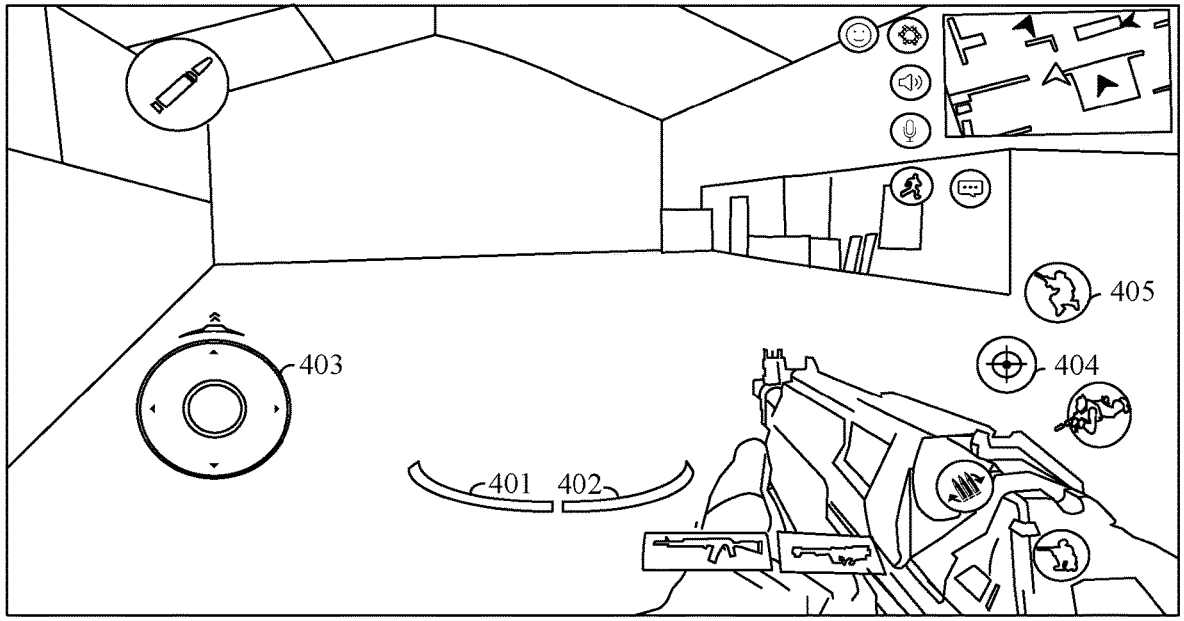
FIG. 4 is a schematic diagram of an interface of a physical strength display component according to an exemplary embodiment of this disclosure.

For example, as shown in FIG. 4, an upper limb strength display component 401 and a lower limb strength display component 402 are displayed in the virtual environment interface. The upper limb strength display component 401 is configured to display a physical strength value of an upper limb. When the virtual object performs an action, a physical strength consumption status and a remaining physical strength status of the upper limb are displayed. Correspondingly, the lower limb strength display component 402 is configured to display a physical strength status of a lower limb.

In Step 302, in response to a target control operation on the virtual object, a target physical strength display component corresponding to the target control operation is determined, a body part corresponding to the target physical strength display component (determined physical strength display component) matching a body part corresponding to a target action indicated by the target control operation.

In an embodiment, the target control operation is a trigger operation for an action control for controlling the action of the virtual object. The action control for controlling the action of the virtual object may be displayed in the virtual environment interface, and when the terminal receives a trigger operation for the action control, it is determined that the target control operation for the virtual object is received.

In a possible implementation, the virtual object may be controlled to perform corresponding actions by clicking action controls in the virtual environment interface. For example, as shown in FIG. 4, when a direction control 403 is dragged, the virtual object may be controlled to walk; when an aiming control 404 is clicked, the virtual object may be controlled to perform a scope-opening action; and when a jumping control 405 is clicked, the virtual object may be controlled to jump.

When the virtual object is controlled to perform actions, different body parts need to be controlled to cooperate. For example, when the virtual object is controlled to walk, the left lower limb and the right lower limb need to be controlled to move to achieve walking; when the virtual object is controlled to aim, the left upper limb and the right upper limb need to be controlled to hold a gun to aim; and when the virtual object is controlled to perform throwing, the right upper limb needs to be controlled to throw virtual items.

To enhance the impact of physical strength consumption on controlling the virtual object to perform the target action to improve the realism of physical strength consumption, in this embodiment of this disclosure, when receiving the target control operation on the virtual object, the terminal may determine a body part, that is, a target body part, that needs to be used to perform the target action corresponding to the target control operation, so that the state of performing the target action is determined according to a physical strength consumption status of the target body part.

In an embodiment, the terminal presets a correspondence between control operations, body parts, and physical strength display components. Subsequently, the terminal determines the target body part corresponding to the target control operation based on the correspondence, and further determines the target physical strength display component corresponding to the target body part.

The target action may need to be collaboratively completed by different body parts, that is, there is at least one target physical strength display component. In addition, different actions performed by the virtual object may correspond to the same physical strength display component, or may correspond to different physical strength display components.

For example, the physical strength display components are divided into an upper limb strength display component and a lower limb strength display component, and the correspondence between control operations, body parts, and physical strength display components is shown in Table 1.

TABLE 1

| Target control operation | Body part | Physical strength display component |
|---|---|---|
| Shoot | Upper limb | Upper limb strength display component |
| Run | Lower limb | Lower limb strength display component |

TABLE 1-continued

| Target control operation | Body part | Physical strength display component |
|---|---|---|
| Crawl forward | Upper limb and lower limb | Upper limb strength display component and lower limb strength display component |

In Step 303, the virtual object is controlled to perform the target action, and a first remaining physical strength value displayed by the target physical strength display component is updated to a second remaining physical strength value, the second remaining physical strength value being less than the first remaining physical strength value.

In a possible implementation, after determining the target physical strength display component, the terminal controls the virtual object to perform the target action according to the remaining physical strength value indicated by the target physical strength display component. Under different remaining physical strength values, statuses of the same action performed by the virtual object are different, thereby simulating the different statuses of the performed action under different physical strength values in reality.

In an embodiment, based on the first remaining physical strength value indicated by the target physical strength display component, the terminal controls the virtual object to perform the target action, where the first remaining physical strength value refers to a current remaining physical strength value of the body part corresponding to the target physical strength display component. When the first remaining physical strength value is different, the status of the action performed by the body part corresponding to the target physical strength display component is different. That is, remaining physical strength values indicated by different physical strength display components have different impacts on the same action performed by the virtual object; and a remaining physical strength value indicated by the same physical strength display component has different impacts on different actions performed by the virtual object.

For example, the virtual object performs a shooting action, the corresponding body part is the upper limb, and the target physical strength display component is the upper limb strength display component. When the remaining physical strength values indicated by the upper limb strength display component are 100 points, 50 points, and 0 points respectively, the shooting stability decreases sequentially. The remaining physical strength value indicated by the lower limb strength display component has no impact on the shooting stability.

After controlling the virtual object to perform the target action, the terminal determines the remaining physical strength value of the body part corresponding to the target physical strength display component after performing the target action, that is, the second remaining physical strength value. After determining the second remaining physical strength value, the terminal updates the first remaining physical strength value displayed in the target physical strength display component to the second remaining physical strength value, thereby displaying the physical strength consumption status of the virtual object performing the target action through the target physical strength display component.

In addition, the remaining physical strength values of different target physical strength display components are updated based on the physical strength values of the corresponding body parts. For example, when the body parts corresponding to the target action are the upper limb and the lower limb, the remaining physical strength value of the upper limb and the remaining physical strength value of the lower limb are respectively determined after the target action is performed, so that a remaining physical strength value in the target physical strength display component corresponding to the upper limb is updated based on the remaining physical strength value of the upper limb, and a remaining physical strength value in the target physical strength display component corresponding to the lower limb is updated based on the remaining physical strength value of the lower limb.

In the foregoing manner, the control of the virtual object to perform the target action is performed by the terminal, and in another possible implementation, the control of the virtual object to perform the target action may be alternatively performed by a server. That is, the server obtains the first remaining physical strength value displayed by the target physical strength display component, determines an execution state of the target action according to the first remaining physical strength value, and controls the virtual object to perform the target action according to the execution state. The terminal then displays a picture of the virtual object performing the target action.

Alternatively, in another possible implementation, the control of the virtual object to perform the target action may be alternatively performed by the terminal and the server in interaction and cooperation. After obtaining the first remaining physical strength value displayed by the target physical strength display component, the terminal sends the first remaining physical strength value to the server. The server determines the execution state of the virtual object performing the target action according to the first remaining physical strength value, and sends the execution status to the terminal. The terminal then controls the virtual object to perform the target action according to the execution state. That is, in this embodiment, the control of the virtual object to perform the target action may be performed by the terminal alone, or by the server alone, or by the terminal and the server in interaction and cooperation, which is not limited in this embodiment.

Based on the above, in the embodiments of this disclosure, the physical strength consumption status of different body parts of the virtual object when performing actions is displayed through the plurality of physical strength display components. Compared with the single display form of physical strength values and physical strength consumption in the related art, the realism of physical strength consumption of the virtual object when performing actions is improved. In addition, the virtual object is controlled to perform actions according to remaining physical strength values of different body parts, which simulates the impact of physical strength consumption on the execution of various actions, thereby improving the authenticity of performing actions by the virtual object, and further improving the authenticity of the battle game.

Figure 5:
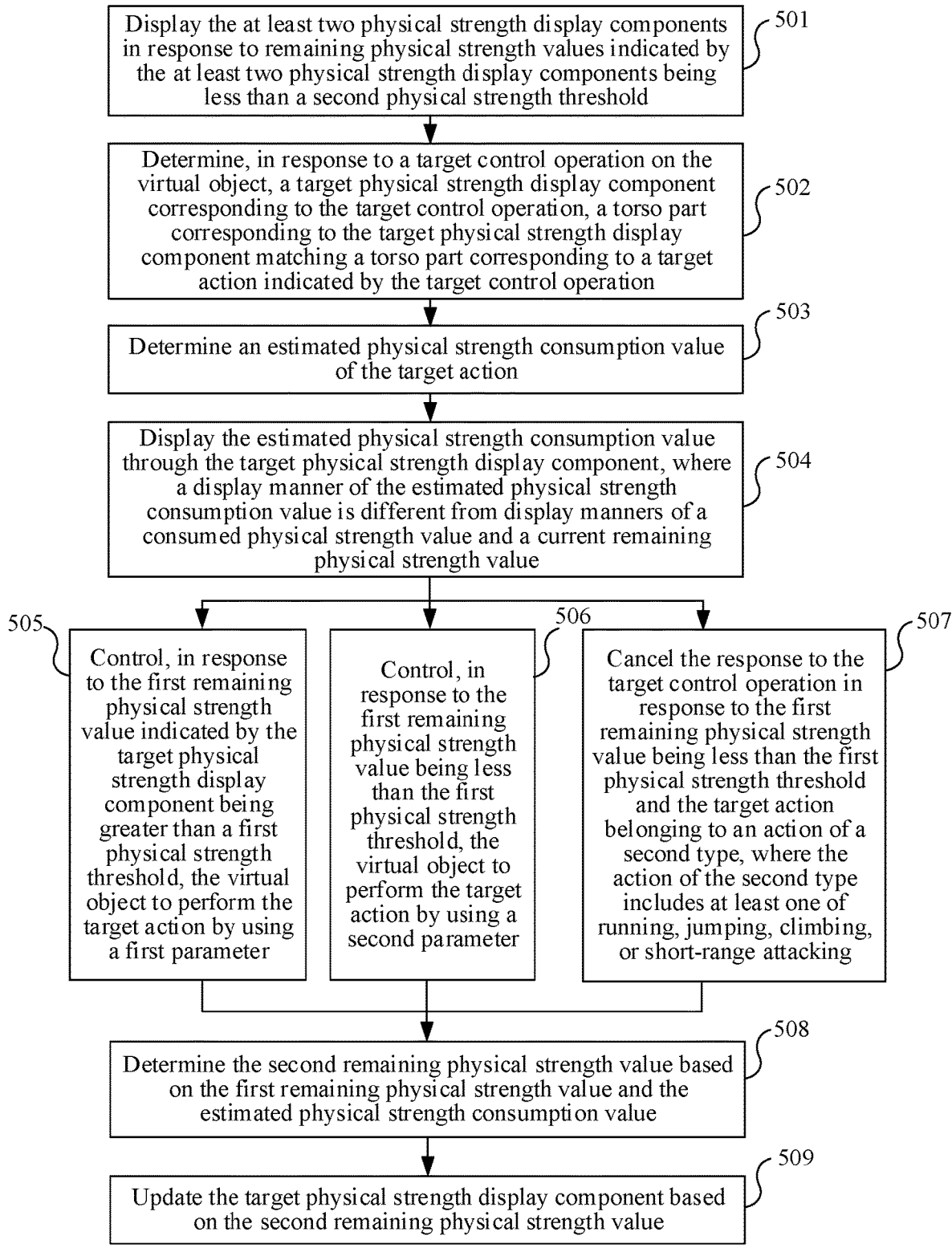
FIG. 5 is a flowchart of a method for controlling a virtual object according to another exemplary embodiment of this disclosure.

FIG. 5 is a flowchart of a method for controlling a virtual object according to another exemplary embodiment of this disclosure. This embodiment is described by using an example in which the method is applied to the first terminal 210 or the second terminal 230 in the implementation environment shown in FIG. 2 or another terminal in the implementation environment. The method includes the following steps.

In Step 501, the at least two physical strength display components are displayed in response to remaining physical strength values indicated by the at least two physical strength display components being less than a second physical strength threshold.

In a possible implementation, the physical strength display components are continuously displayed in the virtual environment interface. In this display manner, the physical strength display components partially occlude the virtual environment picture.

To reduce the occlusion of the virtual environment picture, in another possible implementation, the at least two physical strength display components are displayed in response to remaining physical strength values indicated by the at least two physical strength display components being less than a second physical strength threshold, thereby prompting the physical strength values. If the remaining physical strength values are greater than or equal to the second physical strength threshold, the terminal cancels the display of the physical strength display components to reduce the occlusion of the picture. For example, the second physical strength threshold may be 100 points, and when a physical strength value of a body part of the virtual object is less than 100 points, the terminal displays a physical strength display component.

The at least two physical strength display components may be an upper limb strength display component and a lower limb strength display component. This embodiment of this disclosure further describes the upper limb strength display component and the lower limb strength display component, but is not limited thereto.

In Step 502, in response to a target control operation on the virtual object, a target physical strength display component corresponding to the target control operation is determined, a body part corresponding to the target physical strength display component matching a body part corresponding to a target action indicated by the target control operation.

The target physical strength display component corresponding to the target control operation may be determined according to a main execution body part of the target action corresponding to the target control operation. Further, the main execution body part is determined according to the body division corresponding to the physical strength display components. When the physical strength display components include an upper limb strength display component and a lower limb strength display component, it is determined whether the main execution body part of the target action is an upper limb or a lower limb. When it is determined that the main execution body part is the upper limb, it is determined that the corresponding target physical strength display component is the upper limb strength display component; When it is determined that the main execution body part is the lower limb, it is determined that the corresponding target physical strength display component is the lower limb strength display component; and when it is determined that the main execution body parts are the upper limb and the lower limb, it is determined that the corresponding target physical strength display components are the upper limb strength display component and the lower limb strength display component.

In an embodiment, the terminal determining the corresponding target physical strength display component according to the target control operation may include the following cases.

In case 1, the upper limb strength display component is determined as the target physical strength display component in response to the target action indicated by the target control operation being at least one of aiming, throwing, or short-range attacking.

Figure 6:
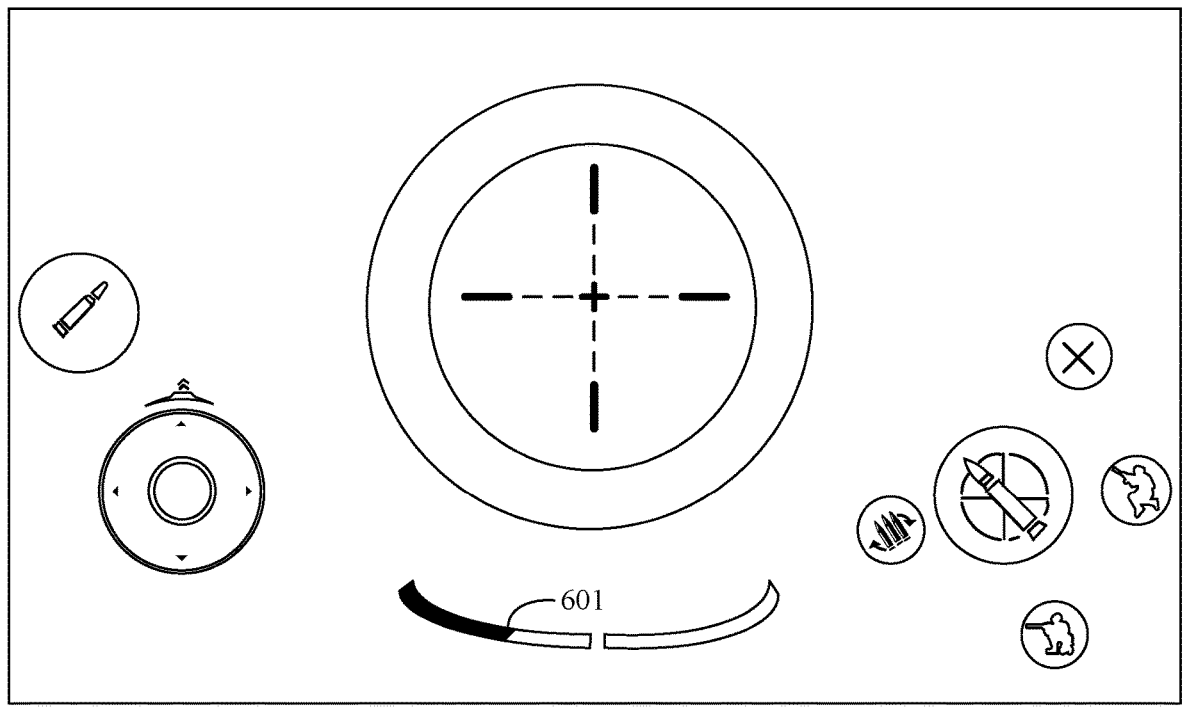
FIG. 6 is a schematic diagram of physical strength display components corresponding to different target control operations according to an exemplary embodiment of this disclosure.

In an embodiment, when the target action indicated by the target control operation is aiming, the terminal controls the virtual object to perform an aiming action. Since the upper limbs need to control virtual items such as pistols, rifles, and sniper rifles to aim at a target, the terminal determines the upper limb strength display component as the target physical strength display component. For example, as shown in FIG. 6, the virtual object performs scope-opening and aiming, and the terminal determines an upper limb strength display component 601 as the target physical strength display component.

Figure 7:
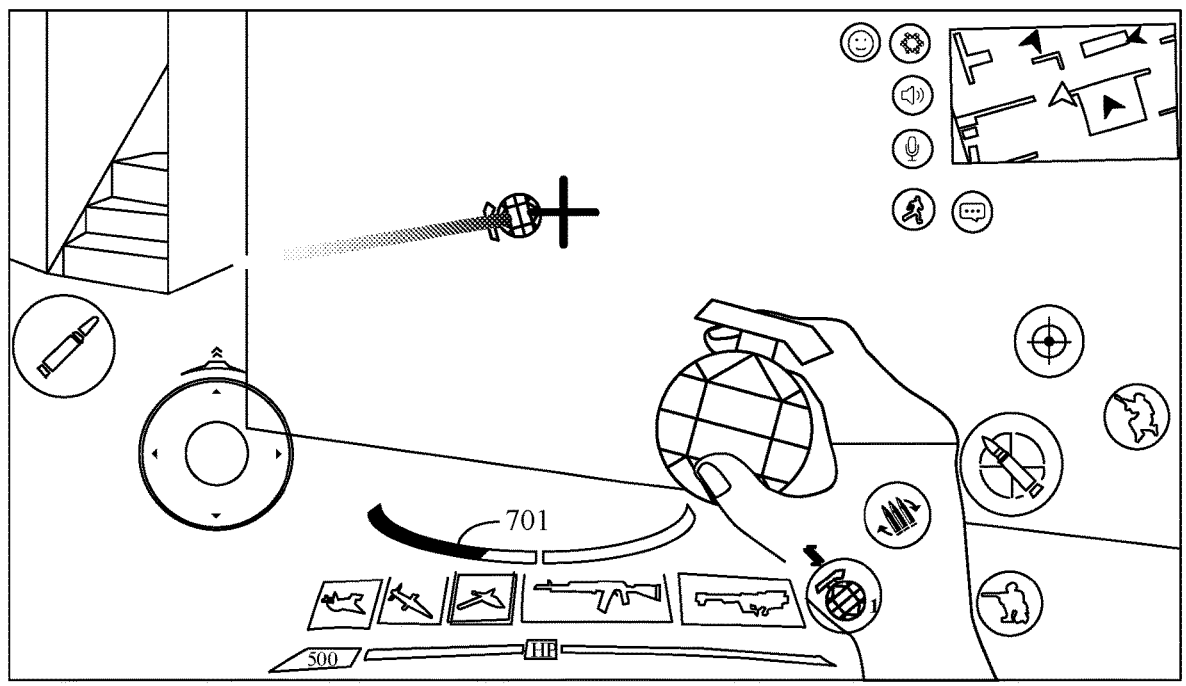
FIG. 7 is a schematic diagram of physical strength display components corresponding to different target control operations according to an exemplary embodiment of this disclosure.

In an embodiment, when the target action indicated by the target control operation is throwing, the terminal controls the virtual object to perform a throwing action. Since the upper limbs throw throwing items such as grenades and smoke grenades to a target position when performing the throwing action, the terminal determines the upper limb strength display component as the target physical strength display component. For example, as shown in FIG. 7, when the virtual object throws a virtual explosive, an upper limb strength display component 701 is determined as the target physical strength display component.

Figure 8:
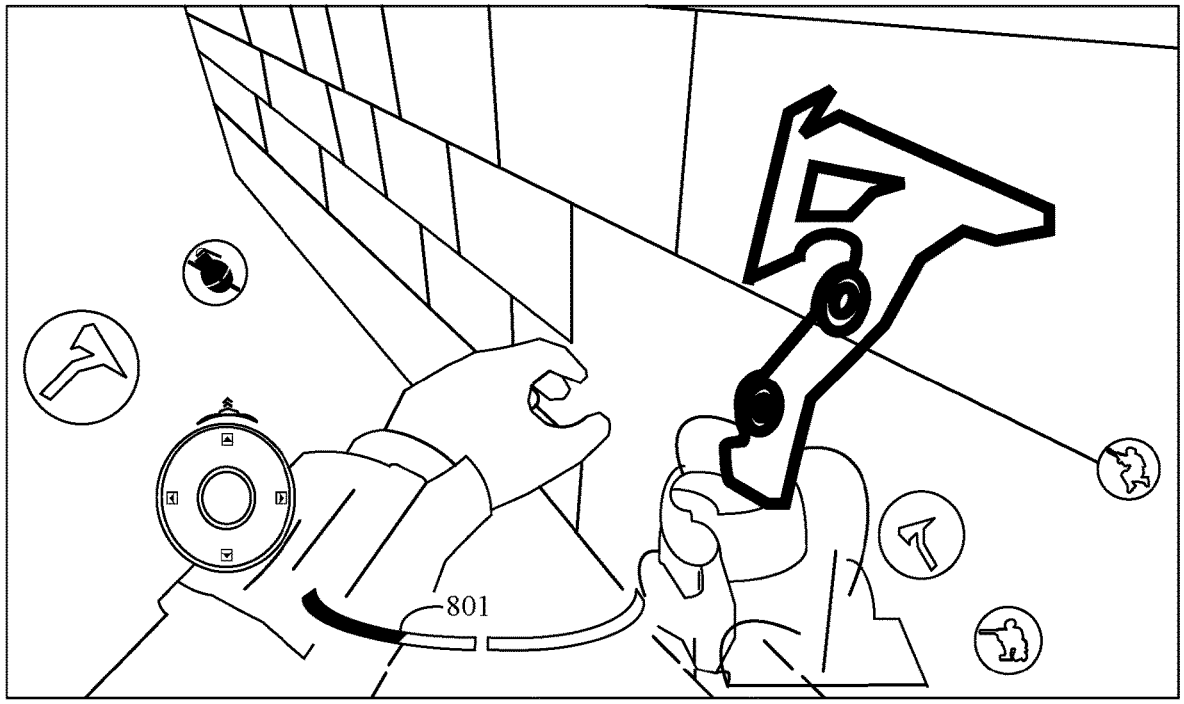
FIG. 8 is a schematic diagram of physical strength display components corresponding to different target control operations according to an exemplary embodiment of this disclosure.

In an embodiment, when the target action indicated by the target control operation is a short-range attack, the terminal controls the virtual object to use melee items (for example, daggers and crowbars) to attack other virtual objects in the virtual environment, where main body parts that the melee items are controlled to attack are upper limbs. Therefore, the terminal determines the upper limb display physical strength component as the target physical strength display component. For example, as shown in FIG. 8, the virtual object uses an axe to perform a short-range attack, and the upper limb strength display component 801 is determined as the target physical strength display component.

In case 2, the lower limb strength display component is determined as the target physical strength display component in response to the target action indicated by the target control operation being at least one of running or jumping.

In an embodiment, when the target control operation is running or jumping, the terminal controls the virtual object to run or jump, and the execution of the action mainly depends on the lower limbs, so that the lower limb strength display component is determined as the target physical strength display component.

In case 3, the upper limb strength display component and the lower limb strength display component are determined as the target physical strength display components in response to the target action indicated by the target control operation being at least one of posture switching or climbing.

In an embodiment, when the target control operation is posture switching, the terminal controls the virtual object to perform posture switching, where the posture switching may be switching from a standing posture to a squatting posture, switching from the squatting posture to a lying posture, and switching from the standing posture to the lying posture. During the posture switching, both upper limbs and lower limbs need to be moved, so that the target physical strength display components are determined as the upper limb strength display component and the lower limb strength display component.

The target physical strength display component corresponding to the posture switching is described in this embodiment of this disclosure, and the specific switching posture is not limited.

In an embodiment, when the target control operation is climbing, the terminal controls the virtual object to perform a climbing action, and the upper limb and lower limb of the virtual object are controlled to perform the action. Therefore, the upper limb strength display component and the lower limb strength display component are determined as the target physical strength display components.

In Step 503, an estimated physical strength consumption value of the target action is determined.

To enable the user to more intuitively understand the physical strength consumption statuses of different body parts when the virtual object is controlled to perform actions, in a possible implementation, the terminal presets estimated physical strength consumption values corresponding to different actions. When the user controls the virtual object to perform a target action, an estimated physical strength consumption value of the target action can be determined.

The estimated physical strength consumption value refers to an estimated physical strength consumption value of a body part corresponding to the target physical strength display component. In an embodiment, when the target action is one of aiming, throwing, or short-range attacking, the estimated physical strength consumption value is a physical strength consumption value corresponding to the upper limbs; when the target action is one of running or jumping, the estimated physical strength consumption value is a physical strength consumption value corresponding to the lower limbs; and when the target action is at least one of posture switching or climbing, the estimated physical strength consumption value is a physical strength consumption value corresponding to the upper limbs and the lower limbs.

For example, the correspondence between different actions and estimated physical strength consumption values is shown in Table 2.

TABLE 2

| Action | Upper limb physical strength consumption value | Lower limb physical strength consumption value |
| --- | --- | --- |
| Aim | 5 points | 0 point |
| Run | 0 point | 10 points |
| Posture switch | 5 points | 5 points |
| Climb | 10 points | 10 points |

When the target action is aiming, an estimated upper limb physical strength consumption value is 5 points; and when the target action is posture switching, an estimated upper limb and lower limb physical strength consumption value is 5 points.

In this embodiment of this disclosure, the estimated physical strength consumption value of the target action refers to an estimated physical strength consumption value of a single action or an estimated physical strength consumption value of an action per unit time. For example, when the target action is aiming, an upper limb physical strength consumption value of a single aiming is 5 points; and when the target action is running, an estimated physical strength consumption value of running within a unit duration is 10 points, where the unit duration may be 30 s, 1 min, 5 min, or the like, which is not limited in this embodiment of this disclosure.

To further improve the realism of physical strength consumption when the virtual object performs actions, in a possible implementation, the estimated physical strength consumption value of the target action may be alternatively determined according to a current posture of the virtual object, including the following steps.

In Step 1, a posture (first posture) of the virtual object is obtained, where the posture of the virtual object includes at least one of a standing posture, a squatting posture, or a lying posture.

In a possible implementation, the terminal determines a fixed physical strength consumption value according to the target action, and this manner cannot simulate the phenomenon that the physical strength consumption of an object performing an action in different postures is different in a real environment. Therefore, to further improve the realism of the game, in another possible implementation, the estimated physical strength consumption value of the target action can be determined according to the current posture of the virtual object. Therefore, when determining the estimated physical strength consumption value of the target action, the current posture of the virtual object may be obtained first, including at least one of the standing posture, the squatting posture, or the lying posture.

In Step 2, the estimated physical strength consumption value of the target action is determined according to the posture, where when a same action is performed under different postures, estimated physical strength consumption values are different.

In a possible implementation, when the virtual object performs the same action under different postures, estimated physical strength consumption values are different. For example, when the virtual object performs the aiming action in a standing state, an estimated physical strength consumption value of the upper limb is greater than an estimated physical strength consumption value of the virtual object in a lying state. In another example, when the virtual object performs a jumping action in the standing state, an estimated physical strength consumption value of the lower limb is less than an estimated physical strength consumption value of the lower limb of the virtual object in the squatting state. For example, when the virtual object performs the same action, estimated physical strength consumption values of the action in different states are shown in Table 3.

TABLE 3

| Action | Current posture | Estimated physical strength consumption value |
|---|---|---|
| Aim | Standing posture | 5 points |
|  | Lying posture | 3 points |
| Jump | Standing posture | 5 points |
|  | Squatting posture | 10 points |

The different estimated physical strength consumption values under different postures are described above. However, in real life, when the object is weighted with, that is, carries different weights of items, that is, physical strength values consumed when performing the same action are not the same. Therefore, in another possible implementation, to further improve the realism of physical strength consumption, the estimated physical strength consumption value of the target action may be determined according to a quantity of virtual items currently carried by the virtual object.

The estimated physical strength consumption value of the target action may be determined according to a filling ratio of a virtual backpack, where the filling ratio of the virtual backpack is positively correlated with the estimated physical strength consumption value. In addition, when the filling ratios of virtual backpacks of different capacities are the same, the estimated physical strength consumption values of the virtual object when performing the target action are also different. In addition, the terminal may pre-store a correspondence between virtual backpacks of different capacities, filling ratios, and estimated physical strength consumption values. After a filling ratio of virtual items in the current virtual backpack of the virtual object is determined, a corresponding estimated physical strength consumption value can be determined.

For example, a correspondence between a filling ratio of a virtual backpack with the maximum capacity and an estimated physical strength consumption value stored in the terminal may be shown in Table 4.

TABLE 4

| Action | Filling ratio of virtual backpack | Estimated physical strength consumption value |
|---|---|---|
| Aim | Less than 30% | 3 points |
|  | 30%-60% | 5 points |
|  | Greater than 60% | 8 points |

For example, when the virtual backpack carried by the current virtual object is filled 50% of its capacity, an estimated upper limb physical strength consumption value is 5 points when the virtual object is controlled to perform the aiming action.

In Step 504, the estimated physical strength consumption value is displayed through the target physical strength display component, where a display manner of the estimated physical strength consumption value is different from display manners of a consumed physical strength value and a current remaining physical strength value (first remaining physical strength value).

In a possible implementation, after determining the estimated physical strength consumption value of the target action, the terminal displays the estimated physical strength consumption value through the target physical strength display component, where a display manner of the estimated physical strength consumption value is different from display manners of a consumed physical strength value and a current remaining physical strength value.

Figure 9:
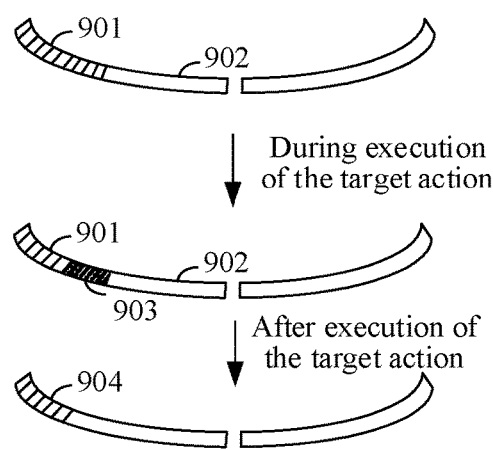
FIG. 9 is a schematic diagram of an interface of a change of a display effect of a physical strength display component before and after execution of an action according to another exemplary embodiment of this disclosure.

For example, when it is detected that the virtual object performs the target action, the physical strength display component changes as shown in FIG. 9. Before the target action is performed, the physical strength display component includes a remaining physical strength value 901 displayed in a first manner and a consumed physical strength value 902 displayed in a second manner. After the estimated physical strength consumption value of the target action is determined, the physical strength display component includes the remaining physical strength value 901 displayed in the first manner, the estimated physical strength consumption value 903 displayed in a third manner, and the consumed physical strength value 902 displayed in the second manner, where the remaining physical strength value 901 is displayed in a bar shadow, the estimated physical strength consumption value 903 is displayed in a block shadow, and the consumed physical strength value 902 is displayed in a transparent form. FIG. 9 shows only a schematic illustration, but does not constitute a limitation. In practical applications, the remaining physical strength value, the estimated physical strength consumption value, and the consumed physical strength value may be alternatively displayed in different colors, different shapes, or the like.

After the virtual object is controlled to perform the target action, the display the estimated physical strength consumption value is stopped.

With reference to the examples in the foregoing steps, when the target action is aiming, the upper limb strength display component displays the estimated physical strength consumption value of 5 points; and when the target action is climbing, the upper limb strength display component and the lower limb strength display component display a physical strength consumption value of 10 points.

In Step 505, in response to the first remaining physical strength value indicated by the target physical strength display component being greater than a first physical strength threshold, the virtual object is controlled to perform the target action by using a first parameter.

In this embodiment of this disclosure, the first physical strength threshold is introduced, to control the virtual object to perform the same action in different states under different remaining physical strength values.

In an embodiment, the first physical strength threshold is a preset value, such as 0. When the remaining physical strength value of the virtual object is greater than 0, the virtual object is controlled to perform the target action by using the first parameter.

The first parameter may include at least one of a speed, strength, or stability of the virtual object performing the action, and the specific type of the first parameter is not limited in the embodiments of this disclosure.

In Step 506, in response to the first remaining physical strength value being less than the first physical strength threshold, the virtual object is controlled to perform the target action by using a second parameter.

In a possible implementation, when a remaining physical strength value indicated by a physical strength display component is less than the first physical strength threshold, it indicates that the corresponding body part of the virtual object consumes more physical strength. In this case, the virtual object is controlled to perform the target action by using the second parameter. An execution effect of the target action under the second parameter is lower than an execution effect of the target action under the first parameter, thereby simulating slowness, laboriousness, and the like when performing an action with too much physical strength consumption in a real environment.

For example, when the remaining physical strength value is less than 0, it indicates that the physical strength of the body part corresponding to the physical strength display component is exhausted. In this case, the virtual object is controlled to perform an action by using the second parameter.

In the related art, after the physical strength of the virtual object is exhausted, the corresponding action cannot be performed, which affects the progress of the game. However, in this embodiment of this disclosure, for an action of a specific type, when the physical strength is insufficient, the virtual object can be controlled, by using a parameter, to perform an action with different execution effects. In a possible implementation, executable actions of the virtual object are divided into two categories, one of which are actions that can still be performed after remaining physical strength values are less than the first physical strength threshold, and the other of which are actions that cannot be performed after remaining physical strength values are less than the first physical strength threshold, enriching the limitation of physical strength consumption on the control of the virtual object.

In a possible implementation, the terminal controls, in response to the current remaining physical strength value being less than the first physical strength threshold and the target action belonging to an action of a first type, the virtual object to perform the target action by using the second parameter, where the action of the first type includes at least one of aiming, throwing, or posture switching.

In a possible implementation, when the target action is the action of the first type including at least one of aiming, throwing, or posture switching, the virtual object is controlled to perform the target action by using the second parameter to ensure that the game can still be played normally and avoid waiting for the recovery of the physical strength value before the operation can be performed to miss the game opportunity.

When the target action is aiming, the first parameter is a first aiming parameter, the second parameter is a second aiming parameter, and aiming stability under the second aiming parameter is lower than aiming stability under the first aiming parameter.

In a possible implementation, when the target action is aiming, the corresponding physical strength display component is the upper limb strength display component. When the current remaining physical strength value in the upper limb strength display component is less than the first physical strength threshold, an aiming stability parameter may be changed to reduce the execution effect of the virtual object and simulate the unstable state of holding a gun after the upper limbs are fatigued in practice.

An aiming parameter may be a lens shaking amplitude, and a lens shaking amplitude of the second aiming parameter is greater than a lens shaking amplitude of the first aiming parameter. For example, under the first aiming parameter, the lens shaking amplitude when the virtual object performs aiming is in a range of −5° to +5°; while under the second aiming parameter, the lens shaking amplitude when the virtual object performs aiming is in a range of −10° to +10°.

When the target action is throwing, the first parameter is a first throwing parameter, the second parameter is a second throwing parameter, and a throwing speed and/or a throwing distance under the second throwing parameter is lower than a throwing speed and/or a throwing distance under the first throwing parameter.

In a possible implementation, when the target action is throwing, the corresponding physical strength display component is the upper limb strength display component. When the current remaining physical strength value in the upper limb strength display component is less than the first physical strength threshold, a throwing parameter may be changed to reduce the execution effect of the virtual object.

The throwing parameter may be a throwing speed, and a throwing speed of the second throwing parameter is lower than a throwing speed of the first throwing parameter. For example, a time from the start of throwing to the end of throwing of the virtual object may be increased from 2 s to 4 s.

The throwing parameter may be alternatively a throwing distance, and a throwing distance of the second throwing parameter is less than a throwing distance of the first throwing parameter. For example, under the first throwing parameter, a maximum throwing range when controlling the throwing of the virtual object is 100 m; while under the second throwing parameter, a maximum throwing range when controlling the throwing of the virtual object is 50 m.

The throwing parameter may be alternatively a combination of the throwing speed and the throwing distance. For example, under the first throwing parameter, the time from the start of throwing to the end of throwing of the virtual object is controlled to be 2 s, and the throwing range can reach 100 m; and under the second throwing parameter, the time from the start of throwing to the end of throwing of the virtual object is controlled to be 4 s, and the throwing range is 50 m.

When the target action is posture switching, the first parameter is a first switching parameter, the second parameter is a second switching parameter, and a posture switching speed under the second switching parameter is lower than a posture switching speed under the first switching parameter.

In a possible implementation, when the target action is posture switching, the corresponding physical strength display components are the upper limb strength display component and the lower limb strength display component. When the current remaining physical strength values in the upper limb strength display component and the lower limb strength display component are less than the first physical strength threshold, a posture switching parameter may be changed to reduce the execution effect of the virtual object.

The switching parameter may be a posture switching delay, and a delay of a first switching parameter is lower than a delay of a second switching parameter. For example, when the virtual object is controlled to switch from the lying posture to the squatting position, the delay may be increased from is to 2 s; when the virtual object switches from the squatting posture to the standing posture, the delay may be switched from is to 2 s; and when the virtual object switches from the lying posture to the standing posture, the delay may be switched from 2 s to 4 s.

In Step 507, the response to the target control operation is canceled in response to the first remaining physical strength value being less than the first physical strength threshold and the target action belonging to an action of a second type, where the action of the second type includes at least one of running, jumping, climbing, or short-range attacking.

In a possible implementation, when the target action is the action of the second type including at least one of running, jumping, climbing, or short-range attacking, the action of this type has less impact on the game. Therefore, after the remaining physical strength value is less than the first physical strength threshold, the action of this type is forbidden. Correspondingly, the virtual object cannot be controlled to perform such an action, to simulate that violent actions cannot be performed after the physical strength is exhausted in practice.

Within the time period when the target action is forbidden, the operation control corresponding to the target control operation may be set to a non-triggerable state to remind the user that the target action has been forbidden.

In an embodiment, when the target action is running or jumping, the target physical strength display component is the lower limb strength display component. Therefore, when the current remaining physical strength value indicated by the lower limb strength display component is less than the first physical strength threshold, running or jumping is forbidden. When the target action is climbing, the target physical strength display component is the upper limb strength display component and the lower limb strength display component. Therefore, when the current remaining physical strength value indicated by at least one physical strength display component of the upper limb strength display component or the lower limb strength display component is less than the first physical strength threshold, climbing is forbidden. When the target action is short-range attacking, the target physical strength display component is the upper limb strength display component. Therefore, when the current remaining physical strength value indicated by the upper limb strength display component is less than the first physical strength threshold, short-range attacking is forbidden.

In Step 508, the second remaining physical strength value is determined based on the first remaining physical strength value and the estimated physical strength consumption value.

Since the second remaining physical strength value is the remaining physical strength value of the body part corresponding to the target action after the virtual object performs the target action, the terminal may determine the second remaining physical strength value according to the first remaining physical strength value and the estimated physical strength consumption value. The first remaining physical strength value is the remaining physical strength value of the body part corresponding to the target action before controlling the virtual object to perform the target action, and the estimated physical strength consumption value is the estimated physical strength consumption value of the corresponding body part when the target action is performed, so that the second remaining physical strength value is determined according to the difference between the first remaining physical strength value and the estimated physical strength consumption value.

In Step 509, the target physical strength display component is updated based on the second remaining physical strength value.

In an embodiment, after determining the second remaining physical strength value, the terminal displays the second remaining physical strength value in the target physical strength display component.

For example, as shown in FIG. 9, after the target action is performed, display of an estimated physical strength consumption value 903 is stopped, and the remaining physical strength value in the target physical strength display component is updated to a second remaining physical strength value 904.

In this embodiment, the first physical strength threshold and the second physical strength threshold are introduced. When the remaining physical strength value in the target physical strength display component is less than the first physical strength threshold, the target actions are divided into two categories, one of which are actions that can still be performed when the remaining physical strength value is less than the first physical strength threshold, and the other of which are actions that cannot be performed when the remaining physical strength value is less than the first physical strength threshold. When the physical strength of the virtual object is insufficient, for an action that can still be performed, an execution effect of the action is controlled by using parameters, simulating that the effect of the action performed by the object when the physical strength is insufficient is different from that when the physical strength is sufficient in the real environment, enhancing the realism of the game, ensuring the normal progress of the game, and avoiding missing the opportunity of the game due to waiting for the recovery of the physical strength value.

In this embodiment, when the virtual object performs an action, an estimated physical strength consumption value may be further displayed, which helps the user to more conveniently learn about physical strength consumption values and remaining physical strength values of different body parts when the current virtual object performs the target action, and improves the intuitiveness of physical strength display.

After controlling the virtual object to perform the target action, the terminal may automatically restore the physical strength value of the virtual object, or may restore the physical strength value of the virtual object when receiving a use operation on a virtual supply item. An exemplary embodiment is provided below for description.

Figure 10:
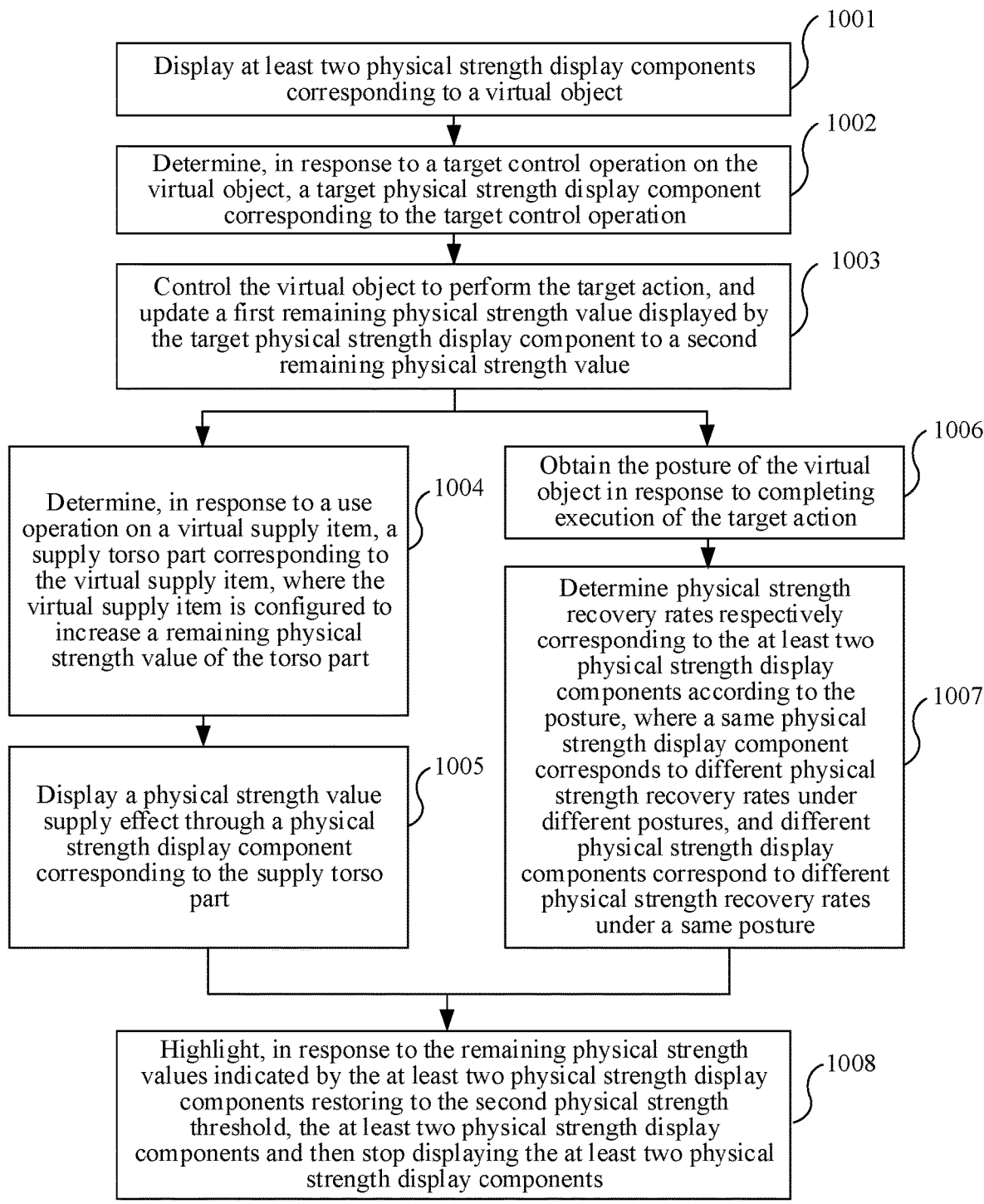
FIG. 10 is a flowchart of a method for controlling a virtual object according to another exemplary embodiment of this disclosure.

FIG. 10 is a flowchart of a method for controlling a virtual object according to another exemplary embodiment of this disclosure. This embodiment is described by using an example in which the method is applied to the first terminal 210 or the second terminal 230 in the implementation environment shown in FIG. 2 or another terminal in the implementation environment. The method includes the following steps.

In Step 1001, at least two physical strength display components corresponding to a virtual object are displayed.

In Step 1002, in response to a target control operation on the virtual object, a target physical strength display component is determined corresponding to the target control operation.

In Step 1003, the virtual object is controlled to perform the target action, and update a first remaining physical strength value displayed by the target physical strength display component to a second remaining physical strength value.

For the implementation of Steps 1001 to 1003, reference may be made to the foregoing embodiments, and details are not repeated in this embodiment.

In Step 1004, in response to a use operation on a virtual supply item, a supply body part corresponding to the virtual supply item is determined, where the virtual supply item is configured to increase a remaining physical strength value of the body part.

In a possible implementation, the virtual object consumes physical strength after performing the target action. In this case, the physical strength value may be recovered by using virtual supply items, such as drinks, snacks, and medicines.

In a possible implementation, the virtual object can increase physical strength values of all body parts by using virtual supply items. However, in another possible implementation, different virtual supply items can supply different body parts. For example, beverage supply items are configured to restore upper limb physical strength values, snack supply items are configured to restore lower limb physical strength values, and medicine supply items may be configured to supply both the upper limb physical strength values and the lower limb physical strength values.

In addition to determining supply body parts corresponding to virtual supply items according to fixed supply body parts corresponding to fixed virtual supply items, the supply body parts corresponding to the virtual supply items may be alternatively determined according to physical strength consumption statuses of different body parts.

In an embodiment, when a use operation on a virtual supply item is received, a current remaining physical strength value in each current physical strength display component is obtained, to determine a corresponding supply body part according to each current remaining physical strength value. In a possible implementation, the terminal may determine a supply body part with the least current remaining physical strength value as a supply body part corresponding to a virtual supply item. For example, when the upper limb strength display component indicates that the remaining physical strength value of the upper limb is 30 points, and the lower limb strength display component indicates that the remaining physical strength value of the lower limb is 50 points, it is determined that the supply body part is the upper limb.

If the current remaining physical strength values indicated by the physical strength display components are the same, it may be determined that the supply body parts are all supply body parts corresponding to the virtual supply item. If the same virtual supply item supplies different supply body parts simultaneously, physical strength recovery values of the different supply body parts are the same. For example, when a virtual supply item can restore a physical strength value of 20 points and supply the upper limb and the lower limb simultaneously, the upper limb and the lower limb restore a physical strength value of 10 points simultaneously.

Alternatively, in another possible implementation, the user can specify a supply body part corresponding to a virtual supply item. After receiving a use operation on the virtual supply item, the terminal may display a selection control corresponding to each body part in the virtual environment picture; and when receiving a selection operation on the target selection control, the terminal may determine a body part corresponding to the target selection control as a supply body part of the virtual supply item.

In Step 1005, a physical strength value supply effect is displayed through a physical strength display component corresponding to the supply body part.

In a possible implementation, after a body part is supplied by using a virtual supply item, a corresponding supply effect is displayed by a corresponding physical strength display component. Different virtual supply items supply by different physical strength values. For example, if a beverage supply item is used, the upper limb strength display component indicates that the physical strength recovers by 5 points; if a snack supply item is used, the lower limb strength display component indicates that the physical strength recovers by 5 points; and if a medicine supply item is used, the upper limb and lower limb strength display components indicate that the physical strength recovers by 10 points.

In Step 1006, the posture (second posture) of the virtual object is obtained in response to completing execution of the target action.

In a possible implementation, after the execution of the target action is completed, the terminal stops controlling the virtual object to perform the action, and the physical strength value of the body part of the virtual object starts to recover at a fixed value. To further improve the realism of the game and simulate different situations of physical strength recovery of the object under different postures in the real environment, in another possible implementation, to simulate the physical strength recovery of the object in the real environment, a recovery speed may be determined according to the posture of the virtual object. Therefore, the current posture of the virtual object needs to be obtained. For example, the target action is aiming, and the posture of the virtual object after the action is completed may be the standing posture, the squatting posture, or the lying posture. The physical strength recovery state of the virtual object subsequently is controlled by obtaining the posture of the virtual object.

In Step 1007, physical strength recovery rates are determined respectively corresponding to the at least two physical strength display components according to the posture, where a same physical strength display component corresponds to different physical strength recovery rates under different postures, and different physical strength display components correspond to different physical strength recovery rates under a same posture.

In a possible implementation, after the target action is performed, the physical strength value is automatically recovered, for example, 5 points are recovered within a unit duration, where the unit duration may be 10 s, 20 s, or the like.

In a possible implementation, a corresponding physical strength recovery rate is determined according to an obtained current posture. The upper limb strength display component and the lower limb strength display component are schematically described. Under different postures, the same physical strength display component corresponds to different physical strength recovery rates. For example, recovery rates of the upper limb strength display component are the lying posture>the squatting posture>the standing posture, and recovery rates of the lower limb strength display component are the lying posture>the standing posture>the squatting posture. A recovery rate may be controlled by changing a physical strength recovery value per unit time. For example, the upper limb strength display component restores a physical strength value of 10 points per unit time in the lying posture, restores a physical strength value of 8 points per unit time in the squatting posture, and restores a physical strength value of 5 points per unit time in the standing posture, where the unit duration may be 10 s, 20 s, or the like.

In an embodiment, different physical strength display components correspond to different physical strength recovery rates under the same posture. For example, when the current posture of the virtual object is the squatting posture, the physical strength recovery rate of the upper limb is greater than the physical strength recovery rate of lower limb.

When the current posture of the virtual object is the lying posture, the physical strength recovery rate of the upper limb is less than the physical strength recovery rate of lower limb.

In Step 1008, in response to the remaining physical strength values indicated by the at least two physical strength display components restoring to the second physical strength threshold, the at least two physical strength display components highlighted and then stopped being displayed.

In a possible implementation, after the remaining physical strength values indicated by the at least two physical strength display components restore to the second physical strength threshold, the physical strength display components are highlighted to remind the player that the corresponding body parts have sufficient physical strength. The display of the physical display components is stopped after highlighting, to reduce the occlusion of the picture.

Figure 11:
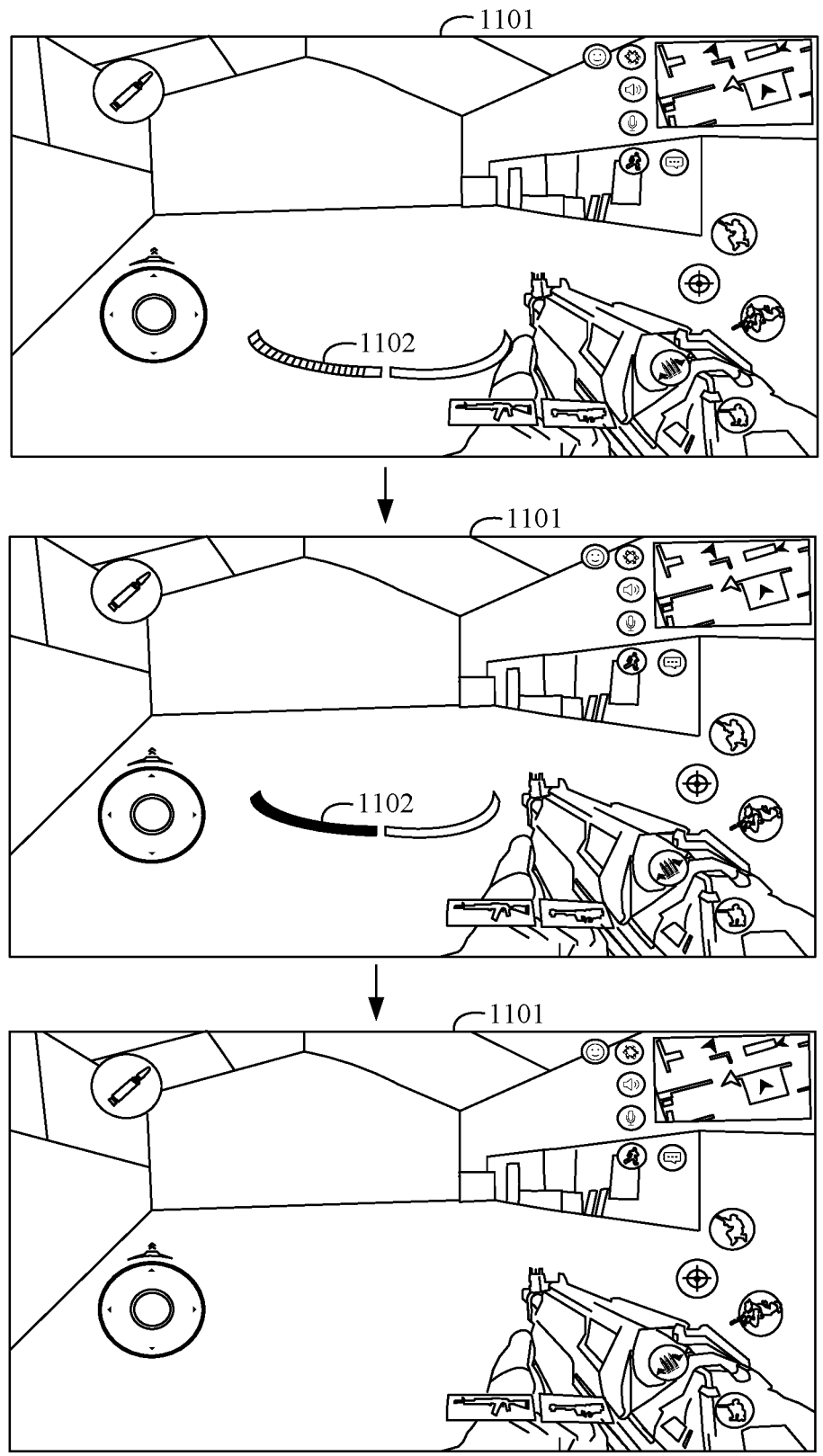
FIG. 11 is a schematic diagram of an interface of a change of a display effect of a physical strength display component during physical strength recovery according to another exemplary embodiment of this disclosure.

For example, as shown in FIG. 11, a physical strength display component 1102 displayed in a virtual environment interface 1101 indicates that a physical strength value is about to be restored to full. When the physical strength value is restored to full, the physical strength display component 1102 displayed in the virtual environment interface 1101 is highlighted. After the highlighting, the display is stopped, and the physical strength display component in the virtual environment interface 1101 disappears.

The at least two physical strength display components may be displayed in the virtual environment interface simultaneously, that is, after the body parts corresponding to the at least two physical strength display components both restore to the second physical strength threshold, the display of the physical strength display components are stopped. The at least two physical strength display components may be alternatively displayed separately in the virtual environment interface, that is, after the body part corresponding to one of the physical strength display components restores to the second physical strength threshold, the display of the physical strength display component is stopped, and the remaining physical strength display components continue to be displayed.

In this embodiment, after the physical strength of the virtual object is insufficient, the physical strength values of different body parts may be supplied by using virtual supply items, and physical strength recovery rates may be further determined according to different postures of the virtual object, thereby simulating that physical strength recovery rates of the object are different in different states in the real environment, and further improving the authenticity of the game.

Figure 12:
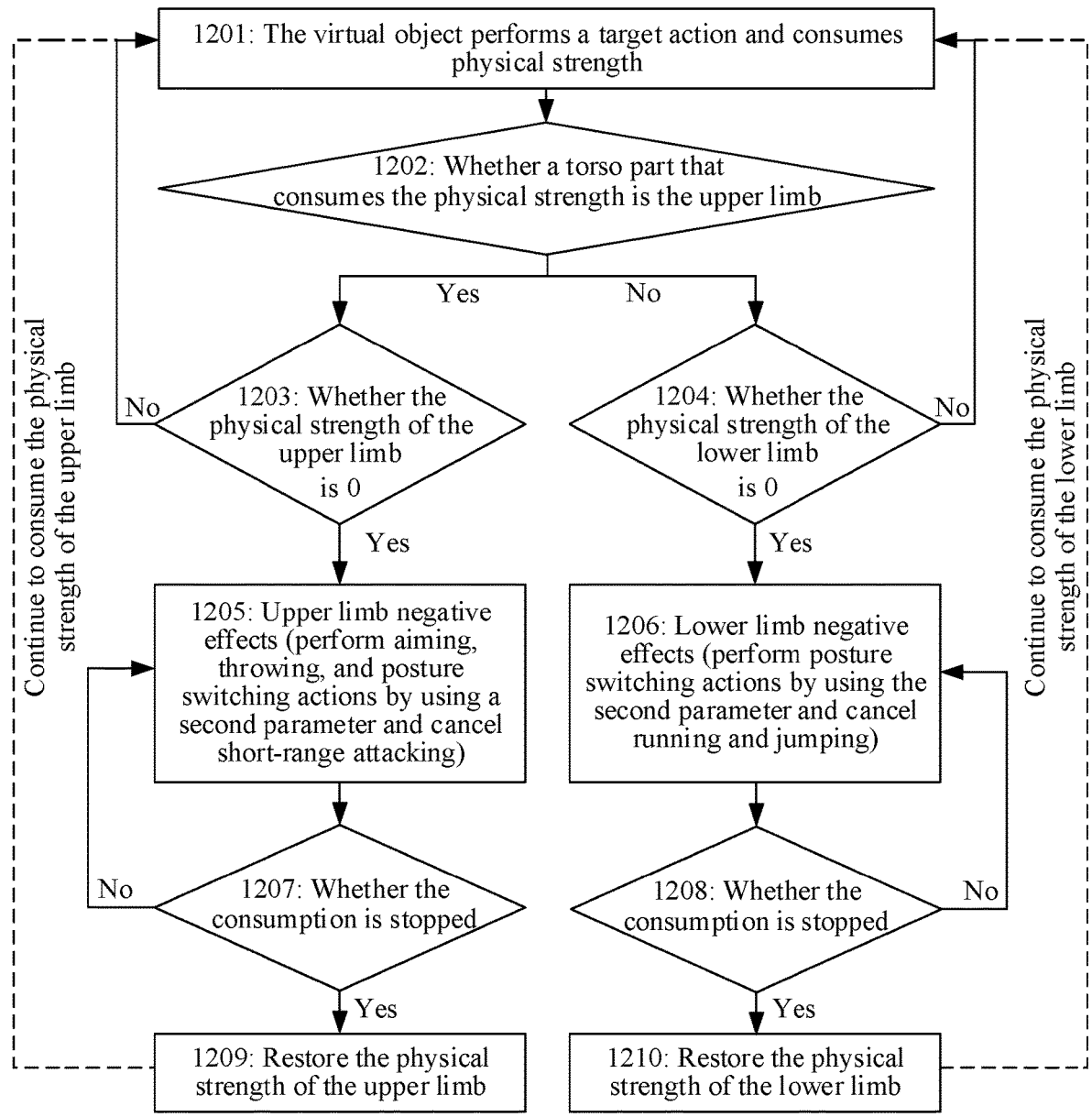
FIG. 12 is a flowchart of a method for controlling a virtual object according to another exemplary embodiment of this disclosure.

With reference to the foregoing embodiments, in an illustrative example, a description is made by dividing body parts of the virtual object into an upper limb and a lower limb. The process of the method for controlling a virtual object is shown in FIG. 12.

In Step 1201, the virtual object performs a target action and consumes physical strength.

In Step 1202, it is detected whether a body part that consumes the physical strength is the upper limb; and if so, Step 1203 is performed; otherwise, Step 1204 is performed.

In Step 1203, it is detected whether a physical strength value of the upper limb is 0; and if so, Step 1205 is performed; otherwise, Step 1201 is performed.

In Step 1204, it is detected whether a physical strength value of the lower limb is 0; and if so, Step 1206 is performed; otherwise, Step 1201 is performed.

In Step 1205, upper limb negative effects are in place (perform aiming, throwing, and posture switching actions by using a second parameter and forbid short-range attacking).

In Step 1206, lower limb negative effects are in place (perform posture switching actions by using the second parameter and forbid actions such as running and jumping).

In Step 1207, it is detected whether consumption of the physical strength of the upper limb is stopped; and if so, Step 1209 is performed; otherwise, Step 1205 is performed.

In Step 1208, it is detected whether consumption of the physical strength of the lower limb is stopped; and if so, Step 1210 is performed; otherwise, Step 1206 is performed.

In Step 1209, the physical strength of the upper limb is restored.

In Step 1210, the physical strength of the lower limb is restored.

Figure 13:
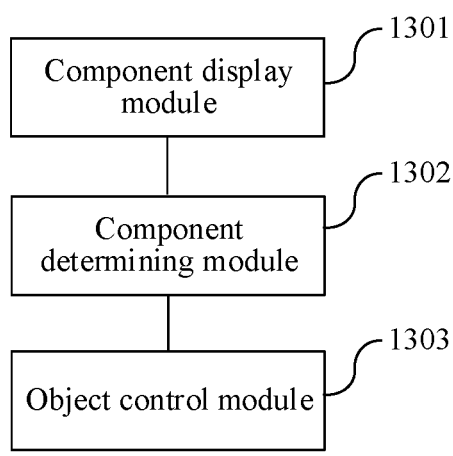
FIG. 13 is a structural block diagram of an apparatus for controlling a virtual object according to an exemplary embodiment of this disclosure.

FIG. 13 is a structural block diagram of an apparatus for controlling a virtual object according to an exemplary embodiment of this disclosure. The apparatus includes: a component display module 1301, configured to display at least two physical strength display components corresponding to a virtual object, the physical strength display components being configured to display a physical strength consumption status of corresponding body parts, and different physical strength display components being corresponding to different body parts; a component determining module 1302, configured to determine, in response to a target control operation on the virtual object, a target physical strength display component corresponding to the target control operation, a body part corresponding to the target physical strength display component matching a body part corresponding to a target action indicated by the target control operation; and an object control module 1303, configured to control the virtual object to perform the target action, and update a first remaining physical strength value displayed by the target physical strength display component to a second remaining physical strength value, the second remaining physical strength value being less than the first remaining physical strength value.

In an embodiment, the object control module 1303 includes: a first control unit, configured to control, in response to the first remaining physical strength value being greater than a first physical strength threshold, the virtual object to perform the target action by using a first parameter; and a second control unit, configured to control, in response to the first remaining physical strength value being less than the first physical strength threshold, the virtual object to perform the target action by using a second parameter.

In an embodiment, an execution effect of the target action under the second parameter is lower than an execution effect of the target action under the first parameter.

In an embodiment, the second control unit is further configured to: control, in response to the first remaining physical strength value being less than the first physical strength threshold and the target action belonging to an action of a first type, the virtual object to perform the target action by using the second parameter, where the action of the first type includes at least one of aiming, throwing, or posture switching; and the apparatus further includes: a cancellation module, configured to cancel the response to the target control operation in response to the first remaining physical strength value being less than the first physical strength threshold and the target action belonging to an action of a second type, where the action of the second type includes at least one of running, jumping, climbing, or short-range attacking.

When the target action is aiming, the first parameter is a first aiming parameter, the second parameter is a second aiming parameter, and aiming stability under the second aiming parameter is lower than aiming stability under the first aiming parameter.

When the target action is throwing, the first parameter is a first throwing parameter, the second parameter is a second throwing parameter, and a throwing speed and/or a throwing distance under the second throwing parameter is lower than a throwing speed and/or a throwing distance under the first throwing parameter.

When the target action is posture switching, the first parameter is a first switching parameter, the second parameter is a second switching parameter, and a posture switching speed under the second switching parameter is lower than a posture switching speed under the first switching parameter.

In an embodiment, the apparatus further includes: a first determining module, configured to determine an estimated physical strength consumption value of the target action; and a first display module, configured to display the estimated physical strength consumption value through the target physical strength display component, where a display manner of the estimated physical strength consumption value is different from display manners of a consumed physical strength value and a current remaining physical strength value.

In an embodiment, the object control module 1303 further includes: a second determining module, configured to determine the second remaining physical strength value based on the first remaining physical strength value and the estimated physical strength consumption value; and an update module, configured to update the target physical strength display component based on the second remaining physical strength value.

In an embodiment, the first determining module includes: a first obtaining unit, configured to obtain a posture of the virtual object, where the posture of the virtual object includes at least one of a standing posture, a squatting posture, or a lying posture; and a first determining unit, configured to determine the estimated physical strength consumption value of the target action according to the posture, where when a same action is performed under different postures, estimated physical strength consumption values are different.

In an embodiment, the apparatus further includes: an obtaining module, configured to obtain the posture of the virtual object in response to completing execution of the target action; and a third determining module, configured to determine physical strength recovery rates respectively corresponding to the at least two physical strength display components according to the posture, where a same physical strength display component corresponds to different physical strength recovery rates under different postures, and different physical strength display components correspond to different physical strength recovery rates under a same posture.

In an embodiment, the physical strength display components include an upper limb strength display component and a lower limb strength display component.

In an embodiment, the component determining module 1302 includes: a second determining unit, configured to determine the upper limb strength display component as the target physical strength display component in response to the target action indicated by the target control operation being at least one of aiming, throwing, or short-range attacking; a third determining unit, configured to determine the lower limb strength display component as the target physical strength display component in response to the target action indicated by the target control operation being at least one of running or jumping; and a fourth determining unit, configured to determine the upper limb strength display component and the lower limb strength display component as the target physical strength display components in response to the target action indicated by the target control operation being at least one of posture switching or climbing.

In an embodiment, the component display module 1301 is further configured to: display the at least two physical strength display components in response to remaining physical strength values indicated by the at least two physical strength display components being less than a second physical strength threshold.

In an embodiment, the apparatus further includes: a display stopping module, configured to highlight, in response to the remaining physical strength values indicated by the at least two physical strength display components restoring to the second physical strength threshold, the at least two physical strength display components and then stop displaying the at least two physical strength display components.

In an embodiment, the apparatus further includes: a fourth determining module, configured to determine, in response to a use operation on a virtual supply item, a supply body part corresponding to the virtual supply item, where the virtual supply item is configured to increase a remaining physical strength value of the body part; and a second display module, configured to display a physical strength value supply effect through a physical strength display component corresponding to the supply body part.

In the embodiments of this disclosure, the physical strength consumption status of different body parts of the virtual object when performing actions is displayed through the plurality of physical strength display components. Compared with the single display form of physical strength values and physical strength consumption in the related art, the realism of physical strength consumption of the virtual object when performing actions is improved. In addition, the virtual object is controlled to perform actions according to remaining physical strength values of different body parts, which simulates the impact of physical strength consumption on the execution of various actions, thereby improving the authenticity of performing actions by the virtual object, and further improving the authenticity of the battle game.

In this embodiment of this disclosure, the first physical strength threshold and the second physical strength threshold are introduced. When the remaining physical strength value in the target physical strength display component is less than the first physical strength threshold, the target actions are divided into two categories, one of which are actions that can still be performed when the remaining physical strength value is less than the first physical strength threshold, and the other of which are actions that cannot be performed when the remaining physical strength value is less than the first physical strength threshold. When the physical strength of the virtual object is insufficient, for an action that can still be performed, an execution effect of the action is controlled by using parameters, simulating that the effect of the action performed by the object when the physical strength is insufficient is different from that when the physical strength is sufficient in the real environment, enhancing the realism of the game, ensuring the normal progress of the game, and avoiding missing the opportunity of the game due to waiting for the recovery of the physical strength value.

In this embodiment of this disclosure, when the virtual object performs an action, an estimated physical strength consumption value may be further displayed. In addition, when the remaining physical strength value of the target physical strength display component is greater than the second physical strength threshold, the physical strength display component is highlighted and then the display is stopped, which helps the user to more conveniently learn about physical strength consumption values and remaining physical strength values of different body parts of the current virtual object, and reduces the occlusion of the game picture.

In this embodiment of this disclosure, after the physical strength of the virtual object is insufficient, the physical strength values of different body parts may be supplied by using virtual supply items, and physical strength recovery rates may be further determined according to different postures of the virtual object, thereby simulating that physical strength recovery rates of the object are different in different states in the real environment, and further improving the authenticity of the game.

Figure 14:
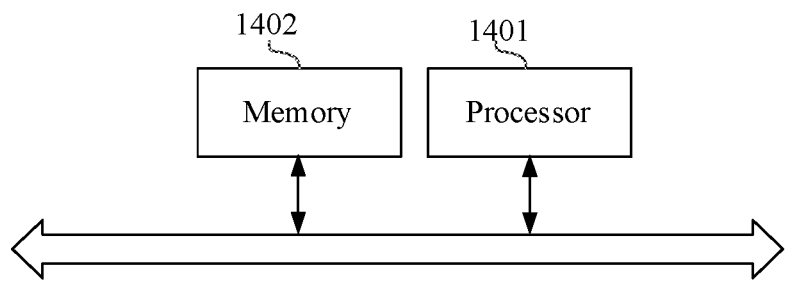
FIG. 14 is a structural block diagram of a terminal according to an exemplary embodiment of this disclosure.

FIG. 14 is a structural block diagram of a terminal according to an exemplary embodiment of this disclosure. The terminal may be a portable mobile terminal, such as a smartphone, a tablet computer, a Moving Picture Experts Group Audio Layer III (MP3) player, or a Moving Picture Experts Group Audio Layer IV (MP4) player. The terminal may be further referred to as other names such as user equipment and a portable terminal.

Generally, the terminal includes a processor 1401 (including processing circuitry) and a memory 1402 (including a non-transitory computer-readable storage medium).

The processor 1401 may include one or more processing cores, for example, a 4-core processor or an 8-core processor. The processor 1401 may be implemented by using at least one hardware form of a digital signal processor (DSP), a field-programmable gate array (FPGA), and a programmable logic array (PLA). The processor 1401 may alternatively include a main processor and a coprocessor. The main processor is configured to process data in an awake state, also referred to as a central processing unit (CPU). The coprocessor is a low-power processor configured to process data in a standby state. In some embodiments, the processor 1401 may be integrated with a graphics processing unit (GPU). The GPU is configured to render and draw content that needs to be displayed on a display screen. In some embodiments, the processor 1401 may further include an artificial intelligence (AI) processor. The AI processor is configured to process computing operations related to machine learning.

The memory 1402 may include one or more computer-readable storage media. The computer-readable storage medium may be tangible and non-transient. The memory 1402 may further include a high-speed random access memory and a non-volatile memory, for example, one or more disk storage devices or flash storage devices. In some embodiments, a non-transitory computer-readable storage medium in the memory 1402 is configured to store at least one instruction, the at least one instruction being configured to be executed by the processor 1401 to implement the method provided in the embodiments of this disclosure.

A person skilled in the art may understand that the structure shown in FIG. 14 constitutes no limitation on the terminal 1400, and the terminal may include more or fewer components than those shown in the figure, or some components may be combined, or a different component deployment may be used.

An embodiment of this disclosure further provides a computer-readable storage medium, storing at least one instruction, the at least one instruction being loaded and executed by a processor to implement the method for controlling a virtual object described in the foregoing embodiments.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The foregoing disclosure includes some exemplary embodiments of this disclosure which are not intended to limit the scope of this disclosure. Other embodiments shall also fall within the scope of this disclosure.

What is claimed is:

1. A method for controlling a virtual object, the method comprising:
   displaying, by processing circuitry of a terminal, at least two physical strength display components corresponding to the virtual object, each of the physical strength display components being configured to display a physical strength consumption status of a corresponding body part of the virtual object, wherein different physical strength display components correspond to different body parts of the virtual object;
   determining, in response to a control operation instructing the virtual object to perform an action, a physical strength display component of the at least two physical strength display components, the determined physical strength display component corresponding to the control operation wherein a body part of the virtual object used to perform the action corresponds to the determined physical strength display component; and controlling the virtual object to perform the action according to a parameter that varies based on a current physical strength value of the corresponding body part of the virtual object indicated by the determined physical strength display component, and updating a first remaining physical strength value displayed by the determined physical strength display component to a second remaining physical strength value, the second remaining physical strength value being less than the first remaining physical strength value.

2. The method according to claim 1, wherein the controlling the virtual object to perform the action comprises:

controlling, in response to the first remaining physical strength value being greater than a first threshold, the virtual object to perform the action by using a first parameter; and controlling, in response to the first remaining physical strength value being less than the first threshold, the virtual object to perform the action by using a second parameter, wherein an execution effect of the action using the second parameter is lower than an execution effect of the action using the first parameter.

3. The method according to claim 2, wherein the controlling, in response to the first remaining physical strength value being less than the first threshold, the virtual object to perform the action by using the second parameter comprises:

in response to (i) the first remaining physical strength value being less than the first threshold and (ii) the action being an action of a first type, controlling the virtual object to perform the action by using the second parameter, wherein the action of the first type comprises at least one of aiming, throwing, or posture switching; and the method further comprises:

in response to (i) the first remaining physical strength value being less than the first threshold and (ii) the action being an action of a second type, canceling the control operation, wherein the action of the second type comprises at least one of running, jumping, climbing, or short-range attacking.

4. The method according to claim 3, wherein when the action is aiming, aiming stability of the second parameter is lower than aiming stability of the first parameter;

when the action is throwing, a throwing speed or a throwing distance of the second parameter is lower than a throwing speed or a throwing distance of the first parameter; and when the action is posture switching, a posture switching speed of the second parameter is lower than a posture switching speed of the first parameter.

5. The method according to claim 1, wherein after the determining, the method further comprises:

determining an estimated physical strength consumption value of the action; and displaying the estimated physical strength consumption value through the determined physical strength display component, wherein a display manner of the estimated physical strength consumption value is different from a display manner of a consumed physical strength value and the first remaining physical strength value.

6. The method according to claim 5, wherein the updating the first remaining physical strength value displayed by the determined physical strength display component to the second remaining physical strength value comprises:

determining the second remaining physical strength value based on the first remaining physical strength value and the estimated physical strength consumption value; and updating the determined physical strength display component based on the second remaining physical strength value.

7. The method according to claim 5, wherein the determining the estimated physical strength consumption value of the action comprises:

obtaining a first posture of the virtual object, wherein the first posture of the virtual object comprises at least one of a standing posture, a squatting posture, or a lying posture; and determining the estimated physical strength consumption value of the action according to the first posture, wherein estimated physical strength consumption values of a same action performed in different postures are different.

8. The method according to claim 7, wherein, after the controlling the virtual object to perform the action, the method further comprises:

obtaining a second posture of the virtual object in response to completing execution of the action; and determining physical strength recovery rates respectively corresponding to the at least two physical strength display components according to the second posture, wherein a same physical strength display component corresponds to different physical strength recovery rates under different postures, and different physical strength display components correspond to different physical strength recovery rates under a same posture.

9. The method according to claim 1, wherein the physical strength display components comprise an upper limb strength display component and a lower limb strength display component; and the determining comprises:

determining the upper limb strength display component as the determined physical strength display component in response to the action indicated by the control operation being at least one of aiming, throwing, or short-range attacking;

determining the lower limb strength display component as the determined physical strength display component in response to the action indicated by the control operation being at least one of running or jumping; and determining both the upper limb strength display component and the lower limb strength display component as the determined physical strength display component in response to the action indicated by the control operation being at least one of posture switching or climbing.

10. The method according to claim 1, wherein the displaying comprises:

displaying the at least two physical strength display components in response to remaining physical strength values indicated by the at least two physical strength display components being less than a second threshold; and the method further comprises:

in response to the remaining physical strength values indicated by the at least two physical strength display components restoring to the second threshold, highlighting the at least two physical strength display components and then stopping display of the at least two physical strength display components.

11. The method according to claim 1, wherein the method further comprises:
in response to a use operation of a virtual supply item, determining a supply body part corresponding to the virtual supply item, wherein the virtual supply item is configured to increase a remaining physical strength value of the body part; and
displaying a physical strength value supply effect through a physical strength display component corresponding to the supply body part.

12. An apparatus for controlling a virtual object, comprising:
processing circuitry configured to
display at least two physical strength display components corresponding to the virtual object, each of the physical strength display components being configured to display a physical strength consumption status of a corresponding body part of the virtual object, wherein different physical strength display components correspond to different body parts;
determine, in response to a control operation instructing the virtual object to perform an action, a physical strength display component corresponding to the control operation, wherein a body part of the virtual object used to perform the action corresponds to the determined physical strength display component; and
control the virtual object to perform the action according to a parameter that varies based on a current physical strength value of the corresponding body part of the virtual object indicated by the determined physical strength display component, and update a first remaining physical strength value displayed by the determined physical strength display component to a second remaining physical strength value, the second remaining physical strength value being less than the first remaining physical strength value.

13. The apparatus according to claim 12, wherein the processing circuitry is further configured to:
control, in response to the first remaining physical strength value being greater than a first threshold, the virtual object to perform the action by using a first parameter; and
control, in response to the first remaining physical strength value being less than the first threshold, the virtual object to perform the action by using a second parameter, wherein
an execution effect of the action using the second parameter is lower than an execution effect of the action using the first parameter.

14. The apparatus according to claim 13, wherein the processing circuitry is further configured to:
in response to (i) the first remaining physical strength value being less than the first threshold and (ii) the action being an action of a first type, control the virtual object to perform the action by using the second parameter, wherein the action of the first type comprises at least one of aiming, throwing, or posture switching; and
in response to (i) the first remaining physical strength value being less than the first threshold and (ii) the action being an action of a second type, cancel the control operation, wherein the action of the second type comprises at least one of running, jumping, climbing, or short-range attacking.

15. The apparatus according to claim 14, wherein
when the action is aiming, aiming stability of the second parameter is lower than aiming stability of the first parameter;
when the action is throwing, a throwing speed or a throwing distance of the second parameter is lower than a throwing speed or a throwing distance of the first parameter; and
when the action is posture switching, a posture switching speed of the second parameter is lower than a posture switching speed of the first parameter.

16. The apparatus according to claim 12, wherein the processing circuitry is further configured to:
determine an estimated physical strength consumption value of the action; and
display the estimated physical strength consumption value through the determined physical strength display component, wherein a display manner of the estimated physical strength consumption value is different from a display manner of a consumed physical strength value and the first remaining physical strength value.

17. The apparatus according to claim 16, wherein the processing circuitry is further configured to:
determine the second remaining physical strength value based on the first remaining physical strength value and the estimated physical strength consumption value; and
update the determined physical strength display component based on the second remaining physical strength value.

18. The apparatus according to claim 16, wherein the processing circuitry is further configured to:
obtain a first posture of the virtual object, wherein the first posture of the virtual object comprises at least one of a standing posture, a squatting posture, or a lying posture; and
determine the estimated physical strength consumption value of the action according to the first posture, wherein estimated physical strength consumption values of a same action performed in different postures are different.

19. The apparatus according to claim 18, wherein the processing circuitry is further configured to, after the virtual object is controlled to perform the action:
obtain a second posture of the virtual object in response to completing execution of the action; and
determine physical strength recovery rates respectively corresponding to the at least two physical strength display components according to the second posture, wherein a same physical strength display component corresponds to different physical strength recovery rates under different postures, and different physical strength display components correspond to different physical strength recovery rates under a same posture.

20. A non-transitory computer-readable storage medium storing computer-readable instructions thereon, which, when executed by processing circuitry, cause the processing circuitry to perform a method for controlling a virtual object, the method comprising:
displaying at least two physical strength display components corresponding to the virtual object, each of the physical strength display components being configured to display a physical strength consumption status of a corresponding body part of the virtual object, wherein different physical strength display components correspond to different body parts of the virtual object;
determining, in response to a control operation instructing the virtual object to perform an action, a physical strength display component corresponding to the control operation wherein a body part of the virtual object used to perform the action corresponds to the determined physical strength display component; and controlling the virtual object to perform the action according to a parameter that varies based on a current physical strength value of the corresponding body part of the virtual object indicated by the determined physical strength display component, and updating a first remaining physical strength value displayed by the determined physical strength display component to a second remaining physical strength value, the second remaining physical strength value being less than the first remaining physical strength value.

* * * * *